(12) United States Patent
Aso et al.

(10) Patent No.: US 10,132,320 B2
(45) Date of Patent: Nov. 20, 2018

(54) PUMP, REFRIGERATION CYCLE APPARATUS, AND METHOD FOR MANUFACTURING PUMP

(75) Inventors: Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 741 days.

(21) Appl. No.: 14/374,938

(22) PCT Filed: Jan. 31, 2012

(86) PCT No.: PCT/JP2012/000598
§ 371 (c)(1),
(2), (4) Date: Oct. 7, 2014

(87) PCT Pub. No.: WO2013/114433
PCT Pub. Date: Aug. 8, 2013

(65) Prior Publication Data
US 2015/0052934 A1    Feb. 26, 2015

(51) Int. Cl.
| | |
|---|---|
| *F04D 25/06* | (2006.01) |
| *F04D 17/10* | (2006.01) |
| *H02K 1/22* | (2006.01) |
| *H02K 15/095* | (2006.01) |
| *H02K 1/14* | (2006.01) |
| *F25B 41/00* | (2006.01) |

(Continued)

(52) U.S. Cl.
CPC ........... *F04D 25/06* (2013.01); *F04D 13/064* (2013.01); *F04D 17/10* (2013.01); *F25B 41/00* (2013.01); *H02K 1/148* (2013.01); *H02K 1/22* (2013.01); *H02K 15/022* (2013.01); *H02K 15/095* (2013.01); *H02K 29/08* (2013.01); *Y10T 29/49012* (2015.01)

(58) Field of Classification Search
CPC ........ F04D 13/064; F04D 1/04; F04D 29/026; F04D 29/2227; F04D 29/628; H02K 15/03; H02K 1/02; H02K 1/27; H02K 1/2733; H02K 29/08; H02K 7/086
See application file for complete search history.

(56) References Cited

U.S. PATENT DOCUMENTS 5,682,072 A * 10/1997 Takahashi ............ H02K 1/2733
                                                    310/156.46
5,861,693 A *  1/1999 Takahashi ............... H02K 1/276
                                                          310/113
2013/0293036 A1* 11/2013 Yamamoto ............. H02K 1/276
                                                          310/43

FOREIGN PATENT DOCUMENTS

JP    4-113413 U    10/1992
JP    2003052159 A   2/2003
(Continued)

OTHER PUBLICATIONS

English translation of JP 2010-124599.*
(Continued)

*Primary Examiner* — Dominick L Plakkoottam
(74) *Attorney, Agent, or Firm* — Posz Law Group, PLC

(57) ABSTRACT

A resin magnet, a magnetic pole position detection resin magnet, and a sleeve bearing, which is disposed inside the resin magnet, are integrally molded together with a thermoplastic resin in a rotor portion. At the same time, an impeller attachment portion is formed by the thermoplastic resin.

9 Claims, 16 Drawing Sheets

(51) Int. Cl.
    *H02K 15/02*     (2006.01)
    *F04D 13/06*     (2006.01)
    *H02K 29/08*     (2006.01)

(56) References Cited

FOREIGN PATENT DOCUMENTS

| | | | |
|---|---|---|---|
| JP | 2005-102390 A | | 4/2005 |
| JP | 2005-323452 A | | 11/2005 |
| JP | 2007-306796 A | | 11/2007 |
| JP | 2008236960 A | | 10/2008 |
| JP | 2009-197729 A | | 9/2009 |
| JP | 2010124599 A | * | 6/2010 |
| JP | 2011-188701 A | | 9/2011 |
| JP | 2011188701 A | * | 9/2011 |
| JP | 2011188702 A | * | 9/2011 |

OTHER PUBLICATIONS

English translation of JP 2011-188701.*
Japanese Office Action dated Aug. 4, 2015 in the corresponding JP application No. 2013-556011. (English translation attached).
Extended European Search Report dated Nov. 25, 2015 in the corresponding EP application No. 12867687.1
International Search Report of the International Searching Authority dated Apr. 24, 2012 for the corresponding international application No. PCT/JP2012/000598 (and English translation).
Office Action dated Mar. 22, 2016 in the corresponding JP application No. 2013-556011 (with English translation).

* cited by examiner

F I G. 5
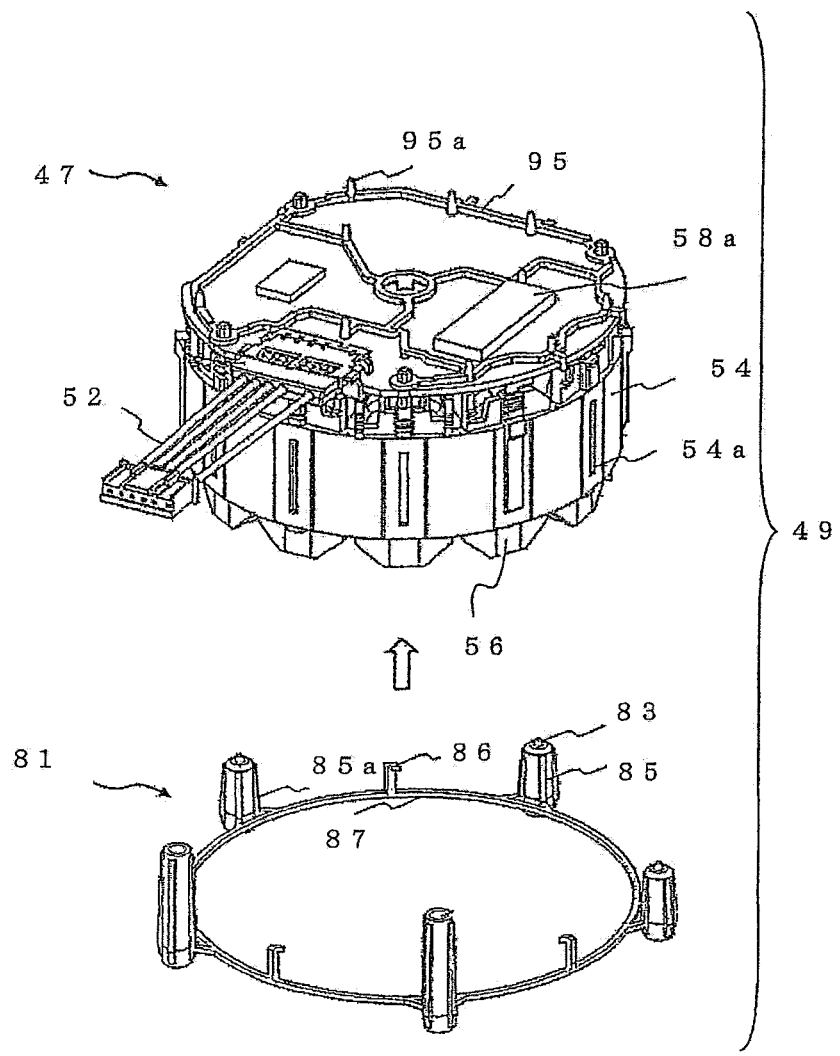

PUMP, REFRIGERATION CYCLE APPARATUS, AND METHOD FOR MANUFACTURING PUMP

CROSS REFERENCE TO RELATED APPLICATIONS

This application is a U.S. national stage application of PCT/JP2012/000598 filed on Jan. 31, 2012, the contents of which are incorporated herein by reference.

TECHNICAL FIELD

The present invention relates to a pump, a refrigeration cycle apparatus, such as an air-conditioning apparatus, a floor heating apparatus, or a hot-water supply apparatus, and a method for manufacturing the pump.

BACKGROUND

Various inventions related to pumps have conventionally been proposed. An example of such an invention is a pump including a cylindrical magnet that is externally coated with a resin and a Hall element that detects the positions of magnetic poles of the magnet. More specifically, a brushless motor and a pump including the brushless motor are disclosed. The brushless motor generates a rotating magnetic field by supplying a current to coils in accordance with a signal from a Hall element that detects positions of magnetic poles of a magnet. Magnet projections are provided on the end surface of the magnet on the side of a Hall element (see, for example, Patent Literature 1). In the pump described in Patent Literature 1, since the magnet projections are provided, the distance between the magnet and the Hall element is reduced. As a result, the magnetic force applied to the Hall element is increased, and does not become insufficient even when the magnet is heated to a high temperature and demagnetized. Consequently, abnormal heating of components of a control unit can be prevented, and normal operation can be continued.

PATENT LITERATURE

Patent Literature 1: Japanese Unexamined Patent Application Publication No. 2005-323452

However, in the pump according to Patent Literature 1, since the outer peripheral portion of the magnet is coated with a resin to fix the magnet in position, the distance between a stator and the magnet is large and there is a risk that the performance of the motor that drives the pump will degrade. In addition, since the projections are provided on the surface of the magnet that opposes the position detection element, although the distance between the magnet and the Hall element is reduced in regions where the projections are provided, the distance between the magnet and the Hall element is increased in regions where the projections are not provided. Therefore, there may be a case in which the magnetic force applied to the Hall element will be insufficient, and there is a risk that the position detection accuracy will reduce.

SUMMARY

The present invention has been made to solve the above-described problems, and provides a pump and a method for manufacturing the pump with which a magnet of a rotor of an electric motor for the pump is securely held and cracking of the magnet due to thermal shock or the like is suppressed so that the quality of the pump can be improved, and with which a main magnetic flux of a position detection magnet is detected by using a ring-shaped position detection magnet so that the position detection accuracy can be increased and the quality of the pump can be improved. The present invention also provides a pump, a refrigeration cycle apparatus, and a method for manufacturing the pump with which the distance between a stator and a magnet in the radial direction is reduced to improve the performance of a motor that drives the pump.

A pump according to the present invention includes a molded stator including a board on which a magnetic pole position detection element is mounted and a rotor including a rotor portion that is rotatably accommodated in a cup-shaped partition wall component, the rotor portion opposing the magnetic pole position detection element at one end and having an impeller attachment portion for attaching an impeller at the other end. In the rotor portion, a magnet, a magnetic pole position detection resin magnet formed in a ring shape, and a sleeve bearing disposed inside the magnet, are assembled together by using a thermoplastic resin, and the impeller attachment portion is formed of the thermoplastic resin. The magnet includes a first projection that serves as a base for the magnetic pole position detection resin magnet. The magnetic pole position detection resin magnet is opposed to the first projection.

With the pump according to the present invention, when the sleeve bearing, the magnet, and the position detection magnet are integrally molded together with a thermoplastic resin, groove portions formed in the outer peripheral portion of the magnet are embedded in the thermoplastic resin. Therefore, the magnet is securely held in the axial and circumferential directions, and cracking of the magnet due to thermal shock or the like can be suppressed, so that the quality of the pump can be improved. In addition, a main magnetic flux of the position detection magnet is detected by using the ring-shaped position detection magnet, so that the position detection accuracy can be increased and the quality of the pump can be improved. Furthermore, since portions other than the groove portions formed in the outer peripheral portion of the magnet are exposed on the outer periphery of the rotor, the distance between the stator and the magnet can be reduced, and the performance of the motor that drives the pump can be improved.

BRIEF DESCRIPTION OF DRAWINGS

FIG. 5 is an exploded perspective view of a stator assembly 49 according to Embodiment 1 of the present invention.

FIG. 10 is a side view of the rotor portion 60a according to Embodiment 1 of the present invention as viewed from the side of an impeller attachment portion 67a.

FIG. 11 is a side view of the rotor portion 60a according to Embodiment 1 of the present invention as viewed from the side opposite to the impeller attachment portion 67a.

FIG. 14 is a side view of the resin magnet 68 according to Embodiment 1 of the present invention as viewed from the side of projections 68a.

FIG. 15 is a side view of the resin magnet 68 according to Embodiment 1 of the present invention as viewed from the side opposite to the projections 68a.

FIG. 16 is a perspective view of the resin magnet 68 according to Embodiment 1 of the present invention as viewed from the side of the projections 68a.

FIG. 17 is a perspective view of the resin magnet 68 according to Embodiment 1 of the present invention as viewed from the side opposite to the projections 68a.

FIG. 18 is a perspective view of the rotor portion 60a according to Embodiment 1 of the present invention as viewed from the side of the projections 68a.

FIG. 19 is a perspective view of the rotor portion 60a according to Embodiment 1 of the present invention as viewed from the side opposite to the projections 68a.

FIG. 22 is a perspective view of a cup-shaped partition wall component 90 according to Embodiment 1 of the present invention as viewed from the side of a cup-shaped partition wall portion 90a.

DETAILED DESCRIPTION

An embodiment of the present invention will now be described in detail with reference to the drawings.

Embodiment 1

Figure 1:
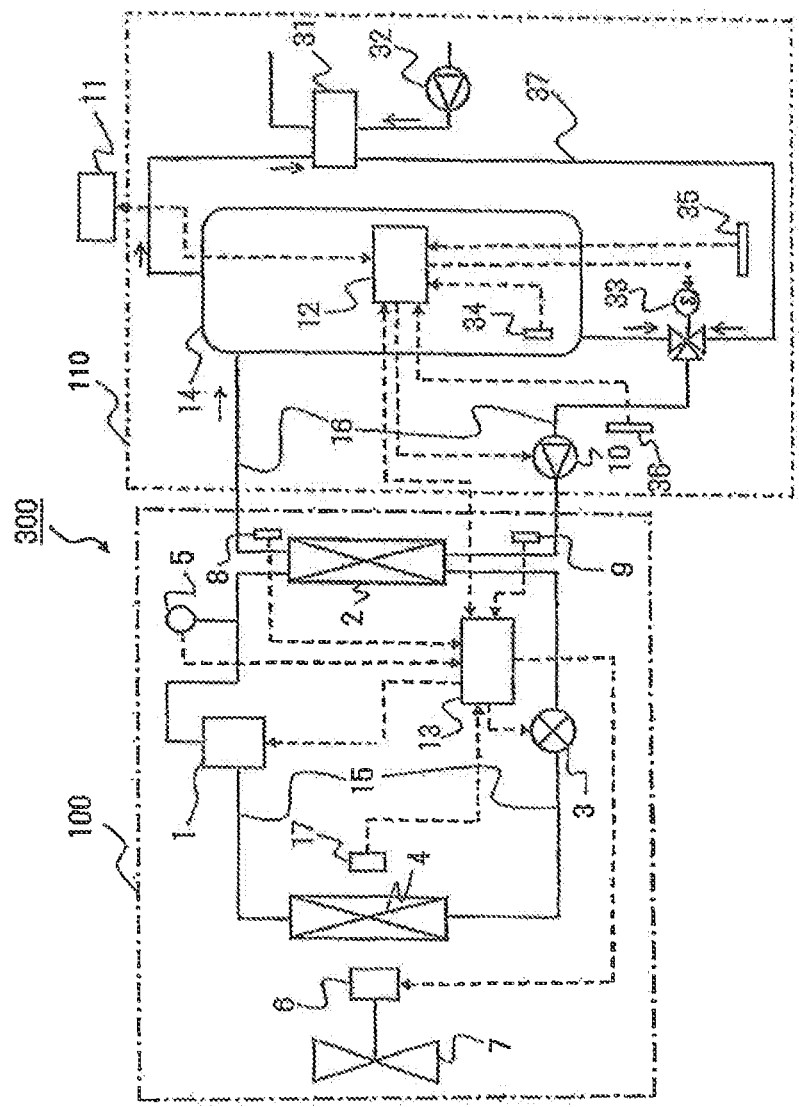
FIG. 1 is a diagram illustrating the configuration of a heat-pump hot-water supply apparatus 300 according to Embodiment 1 of the present invention.

FIG. 1 is a diagram illustrating the configuration of a heat-pump hot-water supply apparatus 300 according to Embodiment 1 of the present invention. The schematic structure of the heat-pump hot-water supply apparatus, which is an example of a refrigeration cycle apparatus including a pump according to Embodiment 1 of the present invention, will be briefly described with reference to FIG. 1. In each of the drawings, including FIG. 1, to be described below, the relationships between the sizes of the components may differ from those in practice.

The heat-pump hot-water supply apparatus 300 is an example of a refrigeration cycle apparatus including a refrigerant circuit, and includes a heat pump unit 100, a tank unit 110, and an operation unit 11 which is, for example, operated by a user.

Referring to FIG. 1, the heat pump unit 100 includes a refrigerant circuit in which a compressor 1 (a rotary compressor, a scroll compressor, etc.) that compresses a refrigerant, a refrigerant-water heat exchanger 2 that causes the refrigerant and water to exchange heat, a decompressor 3 that decompresses and expands a high-pressure refrigerant, and an evaporator 4 that evaporates a low-pressure two-phase refrigerant are connected to each other in a loop via refrigerant pipes 15; a pressure detection device 5 that detects a discharge pressure of the compressor 1; a fan 7 that blows air toward the evaporator 4; and a fan motor 6 that drives the fan 7.

In addition, heating-temperature detection means 8 for the refrigerant-water heat exchanger 2, water-supply-temperature detection means 9 for the refrigerant-water heat exchanger 2, and outside-air-temperature detection means 17 are provided as temperature detection means.

The heat pump unit 100 further includes a heat-pump-unit controller 13. The heat-pump-unit controller 13 receives signals from the pressure detection device 5, the heating-temperature detection means 8, the water-supply-temperature detection means 9, and the outside-air-temperature detection means 17, and performs rotation speed control of the compressor 1, opening degree control of the decompressor 3, and rotation speed control of the fan motor 6.

The tank unit 110 includes a hot-water tank 14 that reserves hot water that has been heated as a result of heat exchange between a high-temperature, high-pressure refrigerant and water in the refrigerant-water heat exchanger 2; a bath-water-reheating heat exchanger 31 that reheats bath water; a bath-water circulating device 32; a pump 10, which serves as a hot-water circulating device disposed between the refrigerant-water heat exchanger 2 and the hot-water tank 14; hot-water circulating pipes 16; a mixing valve 33 connected to the pump 10, the hot-water tank 14, and the bath-water-reheating heat exchanger 31; and bath-water reheating pipes 37 that connect the hot-water tank 14 and the mixing valve 33 to each other.

In addition, a tank-water-temperature detection device 34, a reheated-water-temperature detection device 35 that detects the temperature of the water that has passed through the bath-water-reheating heat exchanger 31, and a mixed-water-temperature detection device 36 that detects the temperature of the water that has passed through the mixing valve 33 are provided as temperature detection means.

The tank unit 110 also includes a tank-unit controller 12. The tank-unit controller 12 receives signals from the tank-water-temperature detection device 34, the reheated-water-temperature detection device 35, and the mixed-water-temperature detection device 36, and performs rotation speed control of the pump 10 and opening and closing control of the mixing valve 33. The tank-unit controller 12 also exchanges signals with the operation unit 11.

The operation unit 11 is, for example, a remote control unit or an operation panel including switches or the like, which allows the user to set the temperature of hot water or issue an instruction to supply hot water.

A normal water heating operation of the heat-pump hot-water supply apparatus having the above-described structure will now be described with reference to FIG. 1. When an instruction for a water heating operation is transmitted from the operation unit 11 or the tank unit 110 to the heat-pump-unit controller 13, the heat pump unit 100 executes the water heating operation.

The heat-pump-unit controller 13, which is included in the heat pump unit 100, performs rotation speed control of the compressor 1, opening degree control of the decompressor 3, and rotation speed control of the fan motor 6 on the basis of, for example, values detected by the pressure detection device 5, the heating-temperature detection means 8, and the water-supply-temperature detection means 9.

In addition, the value detected by the heating-temperature detection means 8 is exchanged between the heat-pump-unit controller 13 and the tank-unit controller 12, and the tank-unit controller 12 controls the rotation speed of the pump 10 so that the temperature detected by the heating-temperature detection means 8 reaches a target heating temperature.

In the heat-pump hot-water supply apparatus 300 controlled in the aforementioned way, the high-temperature, high-pressure refrigerant discharged from the compressor 1 is supplied to the refrigerant-water heat exchanger 2, where the temperature of the refrigerant reduces while heat is transferred to the water supply circuit. The high-pressure, low-temperature refrigerant that has transferred heat and passed through the refrigerant-water heat exchanger 2 is decompressed by the decompressor 3. The refrigerant that has passed through the decompressor 3 flows into the evaporator 4, where the refrigerant receives heat from the outside air. The low-pressure refrigerant that has flowed out of the evaporator 4 is drawn into the compressor 1 by suction, and is circulated. Thus, a refrigeration cycle is formed.

Water in the lower portion of the hot-water tank 14 is guided to the refrigerant-water heat exchanger 2 by driving the pump 10, which serves as a hot-water circulating device. The water is heated by the heat transferred from the refrigerant-water heat exchanger 2. The heated hot water passes through the hot-water circulating pipes 16, and is returned to the upper portion of the hot-water tank 14 so as to accumulate heat.

As described above, in the heat-pump hot-water supply apparatus 300, the pump 10, which serves as a hot-water circulating device that circulates hot water, is provided in the hot-water circulating pipe 16 between the hot-water tank 14 and the refrigerant-water heat exchanger 2.

Figure 2:
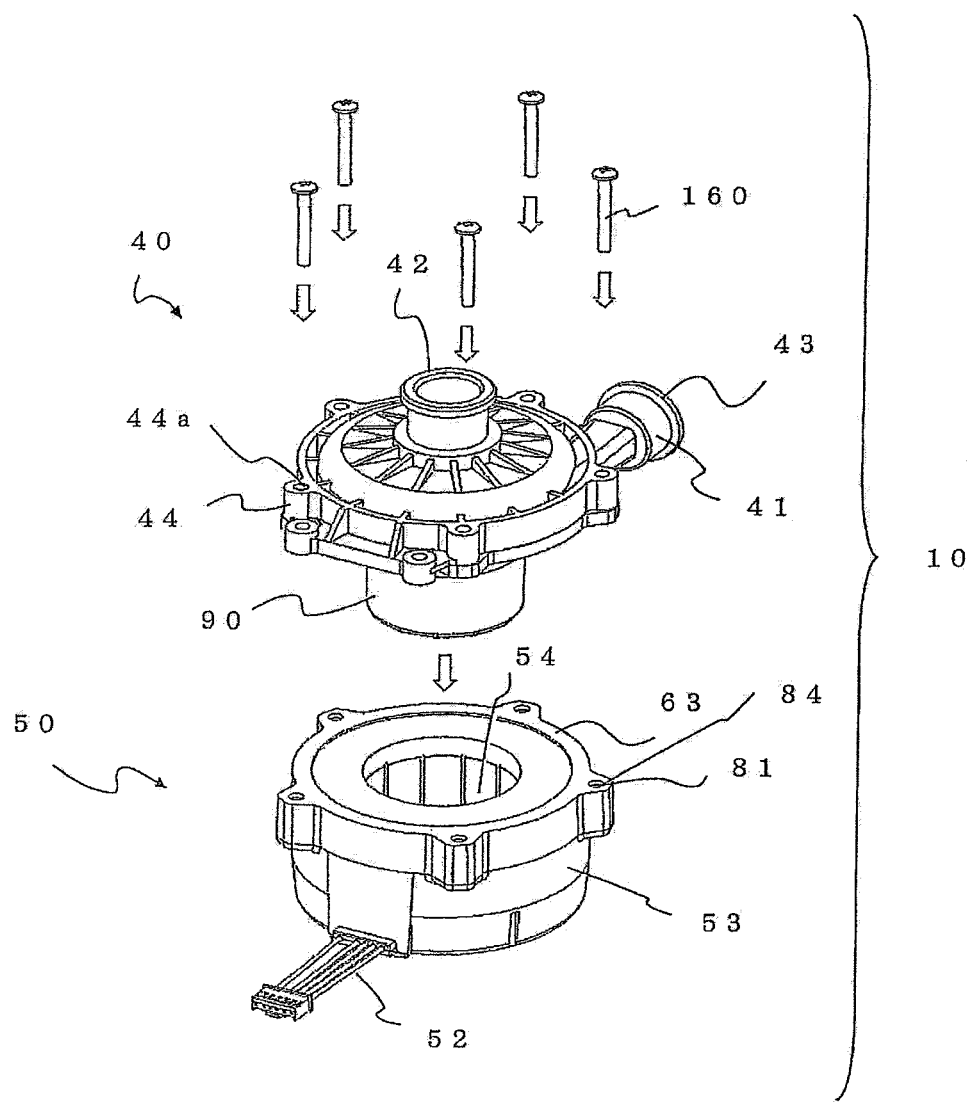
FIG. 2 is an exploded perspective view of a pump 10 according to Embodiment 1 of the present invention.

FIG. 2 is an exploded perspective view of the pump 10 according to Embodiment 1 of the present invention.

As illustrated in FIG. 2, the pump 10 includes a pump unit 40 that draws by suction and discharges water by rotating a rotor (to be described below), a molded stator 50 that drives the rotor, and self-tapping screws 160 (five self-tapping screws are provided in the example of FIG. 2), which serve as fastening screws for fastening the pump unit 40 and the molded stator 50 together. Note, however, that the number of self-tapping screws 160 is not limited to five.

The pump 10 according to Embodiment 1 is assembled by inserting the five self-tapping screws 160 through screw holes 44a formed in boss portions 44 of the pump unit 40 into pilot holes 84 formed in a pilot-hole component 81 (see FIG. 5; to be described below) embedded in the molded stator 50, and tightening the self-tapping screws 160.

Figure 3:
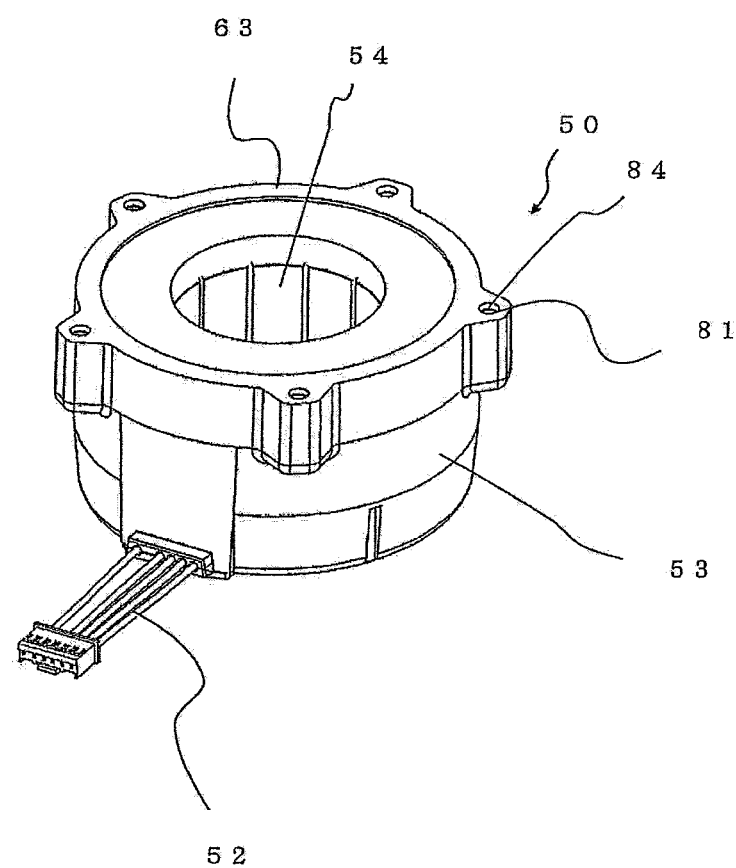
FIG. 3 is a perspective view of a molded stator 50 according to Embodiment 1 of the present invention.
Figure 4:
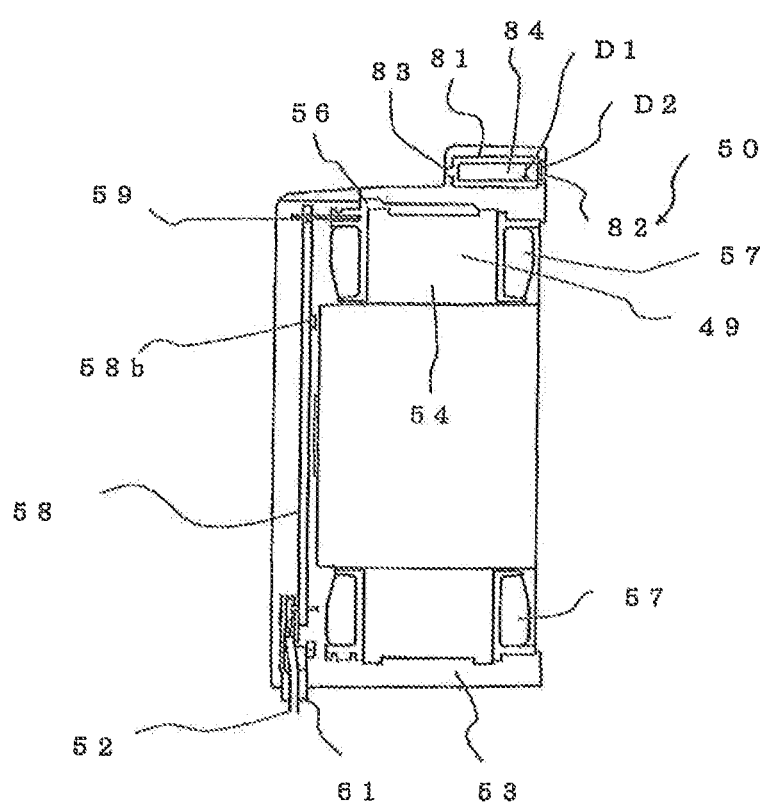
FIG. 4 is a sectional view of the molded stator 50 according to Embodiment 1 of the present invention.

First, the structure of the molded stator 50 will be described. FIG. 3 is a perspective view of the molded stator 50 according to Embodiment 1 of the present invention. FIG. 4 is a sectional view of the molded stator 50 according to Embodiment 1 of the present invention. FIG. 5 is an exploded perspective view of a stator assembly 49 according to Embodiment 1 of the present invention.

As illustrated in FIGS. 3 and 4, the molded stator 50 is formed by molding the stator assembly 49 (see FIG. 5) with a molding resin 53.

One end surface of the molded stator 50 in the axial direction (its end surface on the side of the pump unit 40) is a flat pump-unit receiving surface 63 that extends along the outer peripheral edge.

Leg portions 85 (see FIGS. 4 and 5), which are substantially cylindrical columnar resin molded parts, of the pilot-hole component 81 are embedded in the pump-unit receiving surface 63 so as to extend in the axial direction at five corners. In the molding process using the molding resin 53, one end surface of each leg portion 85 (its end surface on the side of the pump unit 40) of the pilot-hole component 81 serves as a mold pressing portion 82 (see FIG. 4) for a mold. Therefore, the pilot-hole component 81 is exposed at a predetermined depth from the pump-unit receiving surface 63. The mold pressing portions 82 and the pilot holes 84 for the self-tapping screws 160 are exposed.

A lead wire 52 extending from the stator assembly 49 (to be described below) extends to the outside from a position near the end surface of the molded stator 50 on the side opposite to the pump unit 40 in the axial direction (from the left corner in FIG. 4).

In positioning the molded stator 50 in the axial direction in the molding process using the molding resin 53 (thermosetting resin), the outer end surfaces of a plurality of projections 95a on a board pressing member 95 (see FIG. 5) in the axial direction serve as mold pressing portions for an upper mold part. Therefore, the outer end surfaces of the projections 95a in the axial direction (mold pressing surfaces) are exposed on the end surface of the molded stator 50 on the side of a board 58 in the axial direction (not shown).

In addition, the end surfaces of insulating portions 56 on the side opposite to a connection side (on the side of the pump unit 40) serve as mold pressing portions for a lower mold part. Therefore, the end surfaces of the insulating portions 56 on the side opposite to the connection side are exposed on the end surface of the molded stator 50 on the side opposite to the board 58 in the axial direction (not shown).

The molded stator 50 in the radial direction in the molding process is positioned by fitting the inner peripheral surface of a stator core 54 to the mold. Therefore, the end portions (inner peripheral portions) of teeth of the stator core 54 of the stator assembly 49 are exposed on the inner periphery of the molded stator 50 illustrated in FIG. 3.

The inner structure of the molded stator 50, that is, the stator assembly 49 (the lead wire 52, the stator core 54, the insulating portions 56, coils 57, the board 58, terminals 59, etc., illustrated in FIG. 4) and the pilot-hole component 81, will be described below.

Next, the stator assembly 49 will be described. As illustrated in FIG. 5, the stator assembly 49 includes a stator 47 and the pilot-hole component 81.

The stator assembly 49 is manufactured by the following procedure.

(1) Strip-shaped electromagnetic steel sheets are punched out of an electromagnetic steel sheet having a thickness of about 0.1 to 0.7 mm, and are stacked together by caulking, welding, bonding, etc., to form a strip-shaped stator core 54. The strip-shaped stator core 54 includes a plurality of teeth. The end portions of the teeth of the stator core 54 are exposed on the inner periphery of the molded stator 50 illustrated in FIG. 3. The stator core 54 includes twelve teeth that are connected to each other with thin connecting portions. Therefore, in FIG. 3, the end portions of the teeth of the stator core 54 are exposed at twelve positions. However, only five of the twelve teeth are seen in FIG. 3.

(2) Insulating portions 56 are formed on the teeth of the stator core 54. The insulating portions 56 are formed integrally with or separately from the stator core 54 by using a thermoplastic resin, such as polybutylene terephthalate (PBT).

(3) Coils 57 (see FIG. 4), which are concentrated winding coils, are wound around the teeth on which the insulating portions 56 are formed. Twelve concentrated winding coils 57 are connected to form three-phase, single Y-connected windings.

(4) Since the three-phase, single Y-connected windings are formed, the terminals 59 (see FIG. 4; power supply terminals to be supplied with power and a neutral terminal), to which the coils 57 (see FIG. 4) of each phase (U-phase, V-phase, and W-phase) are connected, are provided on the connection side of the insulating portions 56. Three power supply terminals and a single neutral terminal are provided.

(5) A board 58 is attached to the insulating portions 56 on the connection side (the side on which the terminals 59 are attached). The board 58 is clamped between the board pressing member 95 and the insulating portions 56. An IC 58a (drive element) that drives an electric motor (brushless DC motor), a Hall element 58b (see FIG. 4; a position detection element) that detects the position of a rotor 60, etc., are mounted on the board 58. Although the IC 58a is seen in FIG. 5 because it is mounted on the board 58 on the side of the board pressing member 95, the Hall element 58b is not seen in FIG. 5 because it is mounted on the side opposite to the side on which the IC 58a is mounted. The IC 58a and the Hall element 58b are defined as electronic components. A lead-wire guide part 61, which guides the lead wire 52, is attached to a groove in the board 58 at a position near the outer peripheral edge of the board 58.

(6) The board 58 to which the lead-wire guide part 61 is attached is fixed to the insulating portions 56 using the board pressing member 95, and the terminals 59 are soldered onto the board 58, so that the stator 47 is formed. The stator assembly 49 is completed by assembling the pilot-hole component 81 to the stator 47.

The structure of the pilot-hole component 81 will now be described with reference to FIG. 5. The pilot-hole component 81 is molded from a thermoplastic resin, such as polybutylene terephthalate (PBT).

As illustrated in FIGS. 4 and 5, the substantially cylindrical columnar leg portions 85 having the pilot holes 84 for the self-tapping screws 160 are connected to each other via a thin connecting portion 87. To prevent the pilot-hole component 81 from being detached after being molded together with the stator 47, the substantially cylindrical columnar leg portions 85 are tapered such that their thickness is larger in their areas farther from the exposed end surfaces (the mold pressing portions 82 and end portions of projections 83) and closer to the central regions of the leg portions 85.

In addition, the pilot-hole component 81 has a plurality of projections 85a for preventing rotation of the pilot-hole component 81 on the outer periphery of each leg portion 85 (for example, four projections 85a are provided on each leg portion 85). The projections 85a have a predetermined width in the circumferential direction and extend in the height direction of the leg portions 85. The projections 85a project from the outer peripheries of the leg portions 85 by an amount required to prevent rotation of the pilot-hole component 81. The substantially cylindrical columnar leg portions 85 of the pilot-hole component 81 are connected to each other via the thin connecting portion 87, and therefore can be set in a mold at once. Thus, the processing cost can be reduced.

A plurality of tabs 86 for attaching the pilot-hole component 81 to the stator 47 are provided on the connecting portion 87 of the pilot-hole component 81, and are engaged with grooves 54a formed in the outer peripheral portion of the stator core 54 of the stator 47. Accordingly, the stator 47 and the pilot-hole component 81 can be set in the mold at once, and the processing cost can be reduced.

When the stator assembly 49, in which the pilot-hole component 81 is engaged with the stator 47, is molded with the molding resin 53, the end surfaces of the pilot-hole component 81 on the side on which the pilot holes 84 for the self-tapping screws 160 open (mold pressing portions 82) and the projections 83 provided on the end surfaces of the pilot-hole component 81 on the other side are clamped by the mold, so that the pilot-hole component 81 is positioned in the axial direction.

The diameter D2 of the mold pressing portions 82 on the end surfaces of the pilot-hole component 81 on the side on which the pilot holes 84 for the self-tapping screws 160 open is set to be smaller than the diameter D1 of the end surfaces of the pilot-hole component 81 on the opening side (see FIG. 4). Accordingly, the end surfaces of the pilot-hole component 81 are covered with the molding resin 53 in regions other than the mold pressing portions 82. This means that the end surfaces of the pilot-hole component 81 on their two sides are covered with the molding resin 53, so that the area in which the pilot-hole component 81 is exposed can be reduced and the quality of the pump 10 can be improved.

The molded stator 50 is formed by molding the stator 47 and the pilot-hole component 81 attached thereto together with the molding resin 53, and the pilot holes 84 for the self-tapping screws 160 in the leg portions 85 of the pilot-hole component 81 are exposed in this state. The pump unit 40 and the molded stator 50 are assembled together by inserting the self-tapping screws 160 through the screw holes 44a formed in the pump unit 40 and fastening the self-tapping screws 160 to the pilot holes 84. In this way, the pump unit 40 and the molded stator 50 can be securely assembled together (see FIG. 2).

Figure 6:
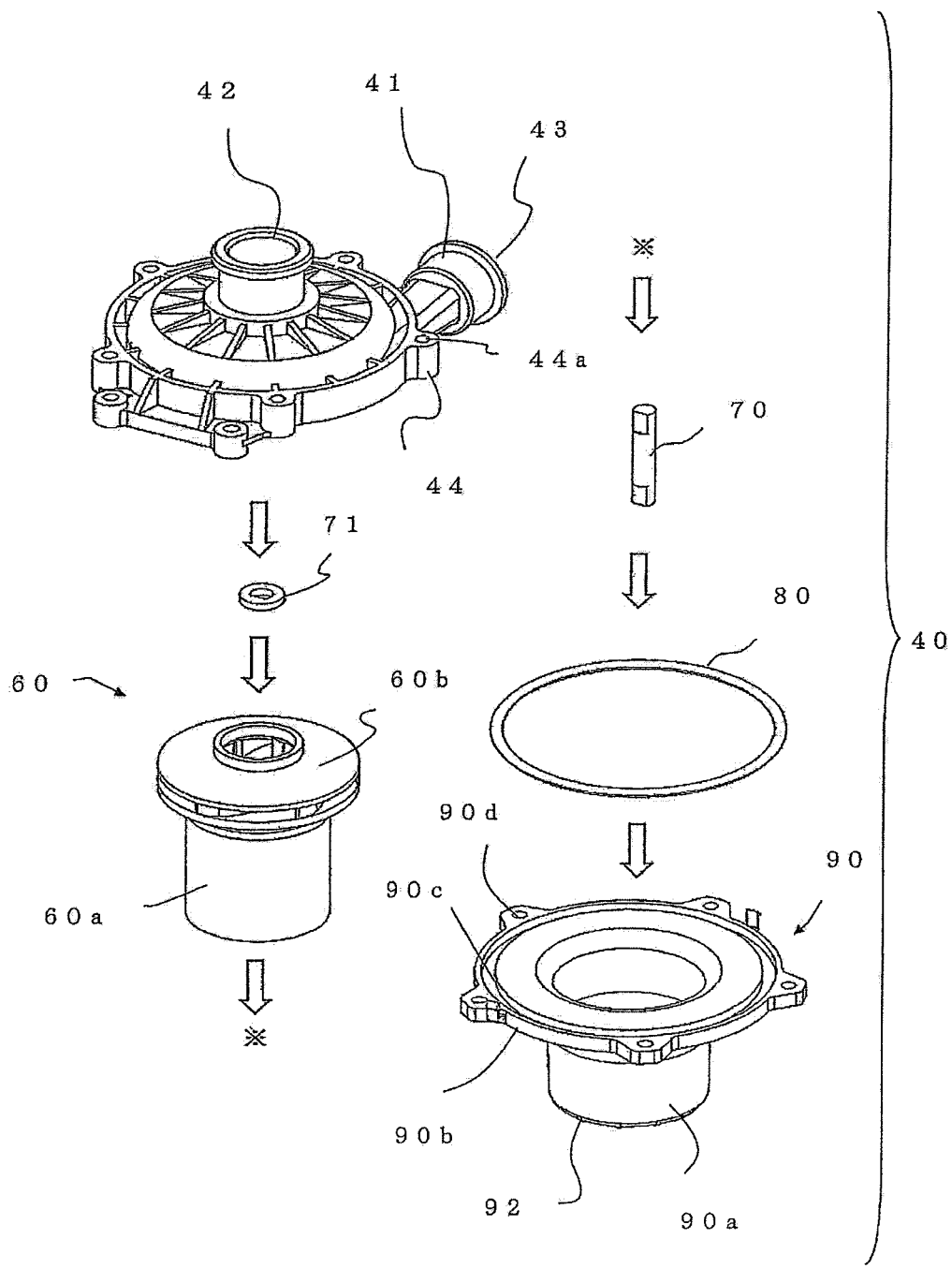
FIG. 6 is an exploded perspective view of a pump unit 40 according to Embodiment 1 of the present invention.
Figure 7:
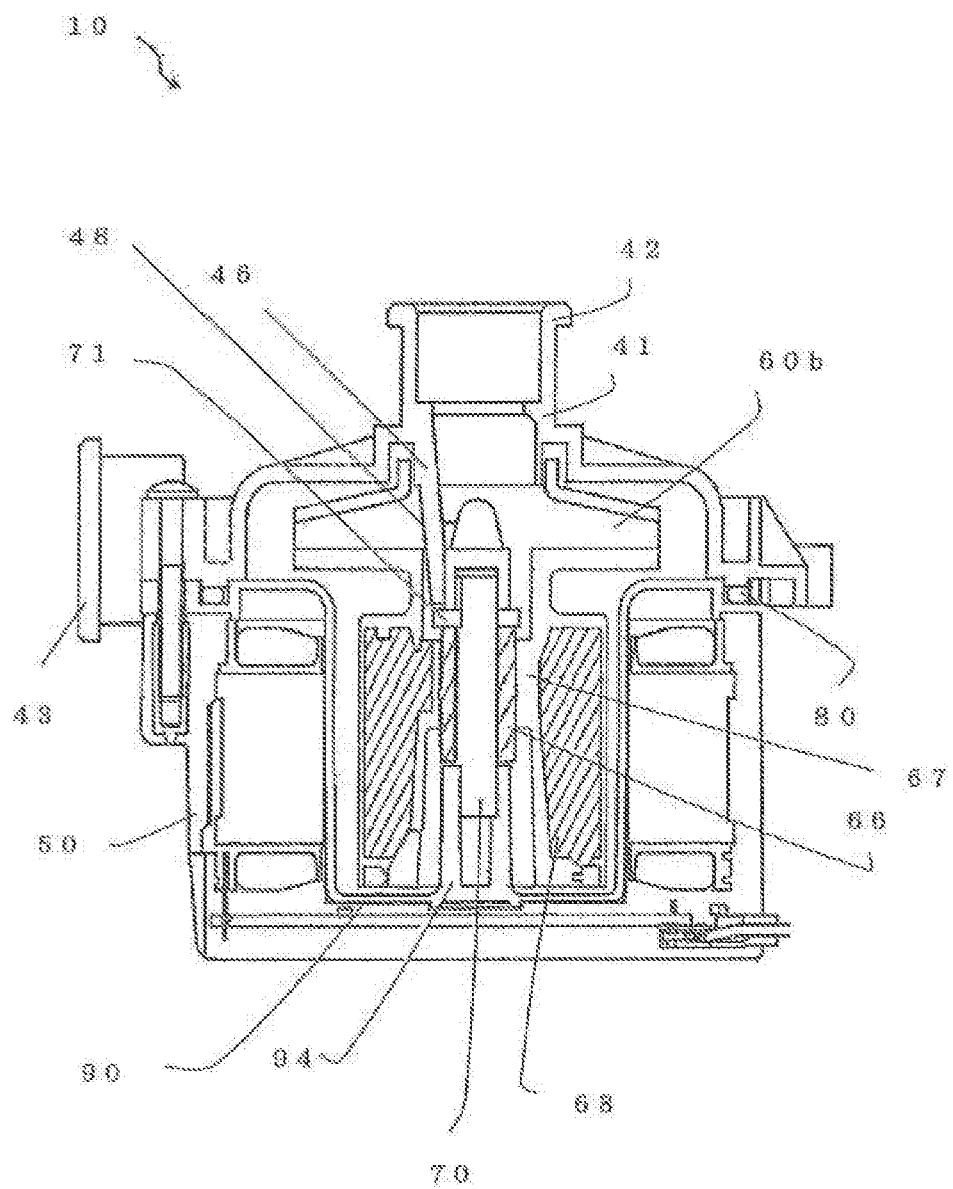
FIG. 7 is a sectional view of the pump 10 according to Embodiment 1 of the present invention.
Figure 8:
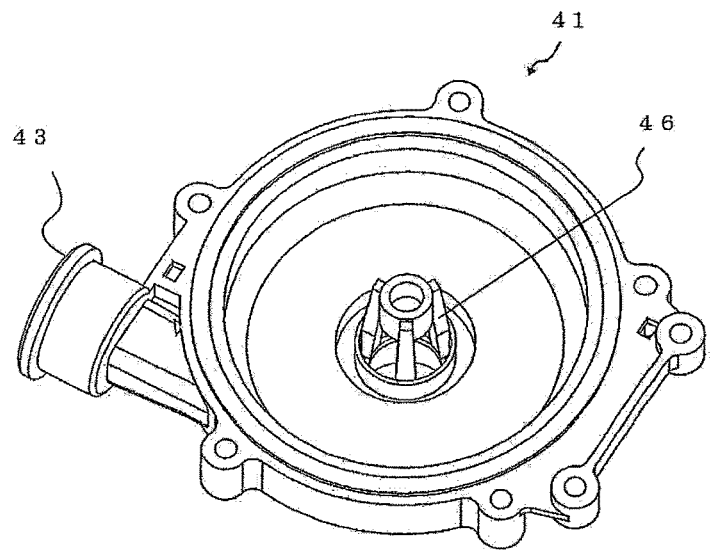
FIG. 8 is a perspective view of a casing 41 according to Embodiment 1 of the present invention as viewed from the side of a shaft support portion 46.
Figure 22:
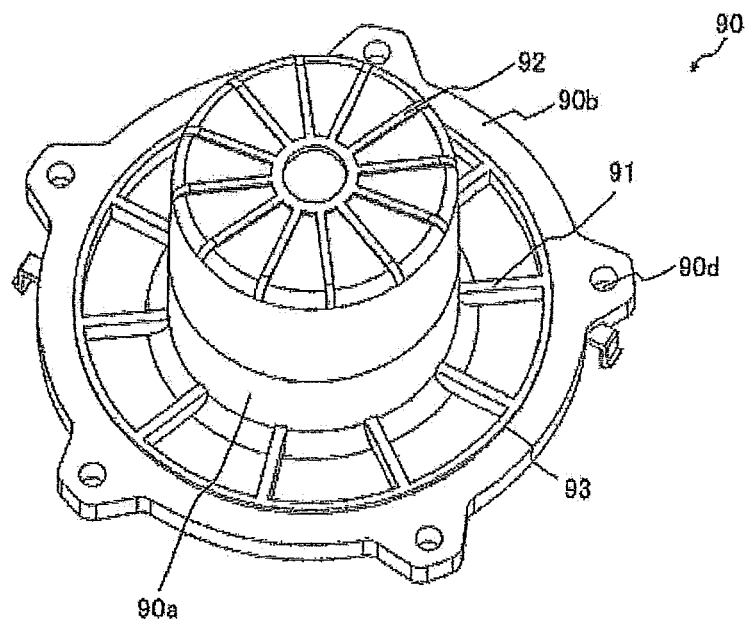

The structure of the pump unit 40 will now be described. FIG. 6 is an exploded perspective view of the pump unit 40 according to Embodiment 1 of the present invention. FIG. 7 is a sectional view of the pump 10 according to Embodiment 1 of the present invention. FIG. 8 is a perspective view of a casing 41 according to Embodiment 1 of the present invention as viewed from the side of a shaft support portion 46. FIG. 22 is a perspective view of a cup-shaped partition wall component 90 according to Embodiment 1 of the present invention as viewed from the side of a cup-shaped partition wall portion 90a. As illustrated in FIG. 6, the pump unit 40 includes the following components.

(1) Casing 41: The casing 41 has a fluid inlet 42 and a fluid outlet 43, and contains an impeller 60b of the rotor 60 therein. The casing 41 is molded from a thermoplastic resin, such as polyphenylene sulfide (PPS). The casing 41 includes five boss portions 44 at its end portion on the side of the fluid inlet 42, the boss portions 44 having the screw holes 44a used to assemble the pump unit 40 and the molded stator 50 together.

(2) Thrust bearing 71: A thrust bearing 71 is formed of ceramics, such as alumina. During the operation of the pump 10, the rotor 60 is pressed against the casing 41 with the thrust bearing 71 being interposed between them owing to the difference between pressures applied to the front and back sides of the impeller 60b of the rotor 60. Therefore, the thrust bearing 71 is formed of ceramics to ensure sufficient wear resistance and sliding performance.

(3) Rotor 60: The rotor 60 includes a rotor portion 60a and the impeller 60b. The rotor portion 60a includes a ring-shaped (cylindrical) resin magnet 68 molded from pellets formed by kneading a powder of a magnetic material, such as ferrite, and a resin; a thin ring-shaped position detection resin magnet molded from pellets formed by kneading a powder of a magnetic material, such as ferrite, and a resin; and a cylindrical sleeve bearing 66 (formed of, for example, carbon) disposed inside the resin magnet 68. The resin magnet 68, the position detection resin magnet, and the sleeve bearing 66 are integrated together with a resin portion 67 formed of, for example, polyphenylene ether (PPE) (see FIG. 9, which will be described below). The impeller 60b is molded from a resin, such as polyphenylene ether (PPE). The rotor portion 60a and the impeller 60b are bonded together by, for example, ultrasonic welding. Embodiment 1 is characterized by the rotor portion 60a of the rotor 60 (to be described in detail below).

(4) Shaft 70: A shaft 70 is formed of, for example, ceramics, such as alumina, or SUS. Since the shaft 70 slides with respect to the sleeve bearing 66 of the rotor 60, a material such as ceramics or SUS is selected to ensure sufficient wear resistance and sliding performance. The shaft 70 has its one end inserted into a shaft support portion 94 of the cup-shaped partition wall component 90, and its other end inserted into the shaft support portion 46 of the casing 41. The shaft 70 has its one end inserted into the shaft support portion 94 of the cup-shaped partition wall component 90 so that the shaft 70 does not rotate relative to the shaft support portion 94. For this purpose, the shaft 70 has its one end formed in a D shape by partially cutting a circular shape thereof over a predetermined length (in the axial direction), and the shaft support portion 94 of the cup-shaped partition wall component 90 has a hole having a shape corresponding to that of the shaft. The other end of the shaft 70 that is inserted into the shaft support portion 46 of the casing 41 is also formed in a D shape by partially cutting a circular shape thereof over a predetermined length (in the axial direction). Thus, the shaft 70 is symmetrical about the center in the longitudinal direction. The other end of the shaft 70 is rotatably inserted into the shaft support portion 46 of the casing 41. The shaft 70 is formed so as to be symmetrical about the center in the longitudinal direction so that it is possible to insert the shaft 70 into the shaft support portion 94 of the cup-shaped partition wall component 90 without controlling the vertical orientation of the shaft 70 (see FIG. 6).

(5) O-ring 80: An O-ring 80 is formed of ethylene-propylene-diene rubber (EPDM) or the like. The O-ring 80 seals the gap between the casing 41 of the pump unit 40 and the cup-shaped partition wall component 90. In pumps installed in hot-water supply apparatuses or the like, seals used in wet areas are required to have a high heat resistance and long life. Therefore, a material such as EPDM is used to ensure sufficient durability.

(6) Cup-shaped partition wall component 90: The cup-shaped partition wall component 90 is formed of a thermoplastic resin, such as polyphenylene ether (PPE). The cup-shaped partition wall component 90 includes the cup-shaped partition wall portion 90a, which is fitted to the molded stator 50, and a flange portion 90b. The cup-shaped partition wall portion 90a includes a circular bottom portion and a cylindrical partition wall. The shaft support portion 94, into which one end of the shaft 70 is inserted, stands on the inner surface of the circular bottom portion in its substantially central region. A plurality of reinforcing ribs 91 (see FIG. 22) (for example, ten reinforcing ribs 91) for reinforcing the flange portion 90b are formed on the flange portion 90b so as to extend in the radial direction. In addition, an annular rib 93 (see FIG. 22) to be fitted to the pump-unit receiving surface 63, for receiving the pump unit 40, of the molded stator 50 is also formed on the flange portion 90b. The flange portion 90b has five holes 90d through which the self-tapping screws 160 are inserted. The flange portion 90b also has an annular O-ring receiving groove 90c for receiving the O-ring 80 in its surface on the side of the casing 41.

The pump 10 is assembled by placing the O-ring 80 on the cup-shaped partition wall component 90, assembling the pump unit 40 by attaching the casing 41 to the cup-shaped partition wall component 90, and fixing the pump unit 40 to the molded stator 50 with the self-tapping screws 160 or the like.

Ribs 92 provided on the bottom portion of the cup-shaped partition wall component 90 are fitted to grooves (not shown) formed in the molded stator 50, so that the pump unit 40 and the molded stator 50 are positioned relative to each other in the circumferential direction.

The rotor 60 is disposed inside the inner periphery of the cup-shaped partition wall portion 90a of the cup-shaped partition wall component 90 such that the rotor 60 is fitted to the shaft 70 that is inserted in the shaft support portion 94 of the cup-shaped partition wall component 90. To allow the molded stator 50 and the rotor 60 to be arranged coaxially, the gap between the inner periphery of the molded stator 50 and the outer periphery of the cup-shaped partition wall portion 90a of the cup-shaped partition wall component 90 is preferably as small as possible. The gap is set to, for example, about 0.02 to 0.06 mm.

If the gap between the inner periphery of the molded stator 50 and the outer periphery of the cup-shaped partition wall portion 90a of the cup-shaped partition wall component 90 is reduced, the space for allowing air to escape when the cup-shaped partition wall portion 90a of the cup-shaped partition wall component 90 is inserted into the space inside the inner periphery of the molded stator 50 is reduced. As a result, it becomes difficult to insert the cup-shaped partition wall component 90.

Figure 9:
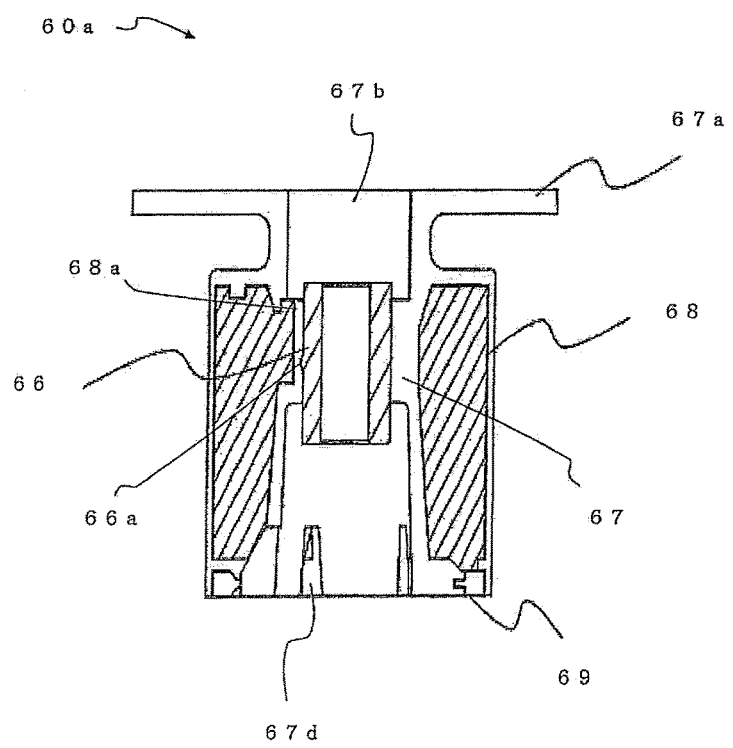
FIG. 9 is a sectional view of a rotor portion 60a according to Embodiment 1 of the present invention (a sectional view of the rotor portion 60a taken along line A-A in FIG. 11).
Figure 10:
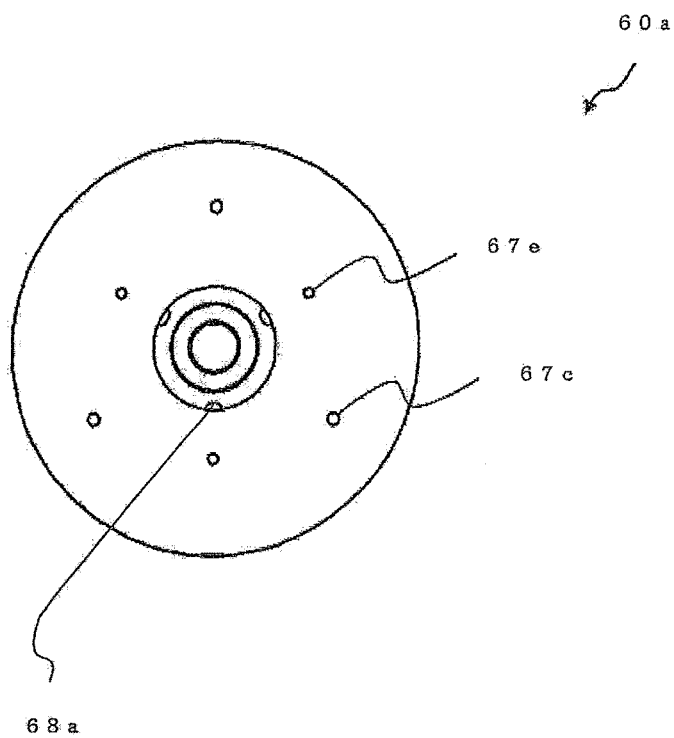
Figure 11:
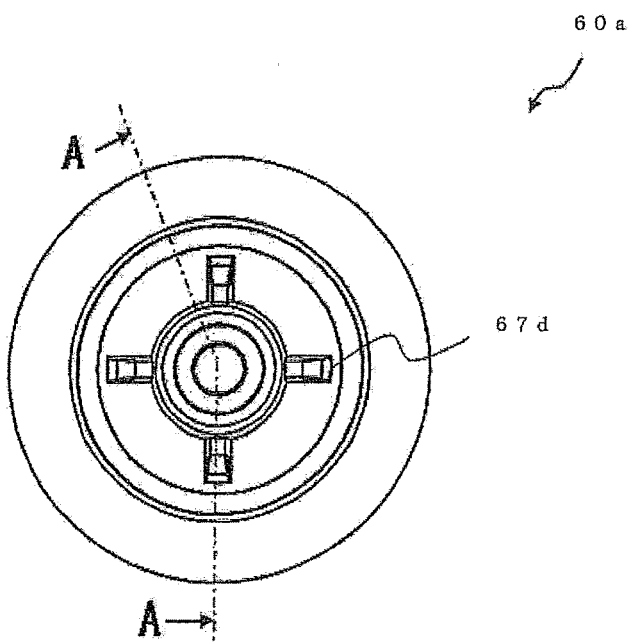
Figure 12:
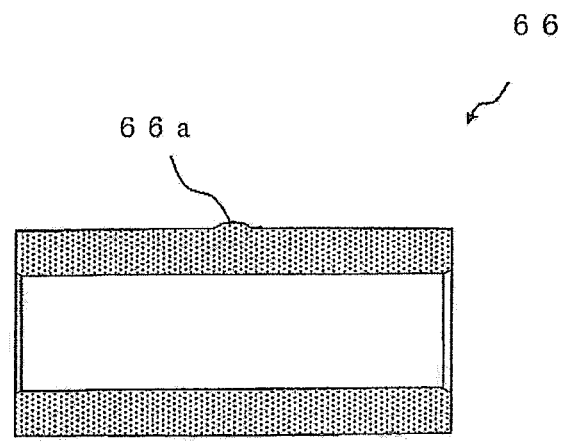
FIG. 12 is an enlarged sectional view of a sleeve bearing 66 according to Embodiment 1 of the present invention.

FIG. 9 is a sectional view of the rotor portion 60a according to Embodiment 1 of the present invention (a sectional view of the rotor portion 60a taken along line A-A in FIG. 11). FIG. 10 is a side view of the rotor portion 60a according to Embodiment 1 of the present invention as viewed from the side of an impeller attachment portion 67a. FIG. 11 is a side view of the rotor portion 60a according to Embodiment 1 of the present invention as viewed from the side opposite to the impeller attachment portion 67a. FIG. 12 is an enlarged sectional view of the sleeve bearing 66 according to Embodiment 1 of the present invention.

The rotor portion 60a will now be described with reference to FIGS. 9 to 12. As illustrated in FIGS. 9 to 11, the rotor portion 60a includes at least the following elements. The resin magnet 68, the magnetic pole position detection resin magnet 69, and the sleeve bearing 66 are integrally molded together with a thermoplastic resin (resin portion 67), such as polyphenylene ether (PPE).

The resin magnet 68 is substantially ring-shaped (cylindrical), and is molded from pellets formed by kneading a powder of a magnetic material, such as ferrite, and a resin.

The magnetic pole position detection resin magnet 69 is thin and substantially ring-shaped, and is molded from pellets formed by kneading a powder of a magnetic material, such as ferrite, and a resin. The magnetic pole position detection resin magnet 69 has steps on their two sides in the thickness direction, and ribs configured to serve as rotation stoppers when embedded in a resin are provided on the steps on the two sides of the magnetic pole position detection resin magnet 69. The inner and outer peripheries of the magnetic pole position detection resin magnet 69 are accurately coaxial.

The sleeve bearing 66 (formed of, for example, carbon) is disposed inside the resin magnet 68. The sleeve bearing 66 has a cylindrical shape. The sleeve bearing 66 is rotated while being fitted to the shaft 70, which is attached to the cup-shaped partition wall component 90 of the pump 10. Therefore, the sleeve bearing 66 is formed of a material suitable for a bearing, such as sintered carbon, a thermoplastic resin, such as polyphenylene sulfide (PPS), to be added with carbon fibers, or ceramics. The sleeve bearing 66 has a hollow tapered construction such that its outer diameter decreases from a region around the axial center toward their two ends, and is provided with a plurality of semispherical projections 66a, serving as rotation stoppers, (see FIG. 12) on its outer periphery in the region around the axial center.

A portion of the resin portion 67, which is formed on the end surface of the resin magnet 68 on the side of the impeller attachment portion 67a, has a first recess 67b at a position corresponding to a magnet pressing portion provided on the upper part of a mold used in resin molding. In the example illustrated in FIG. 9, the first recess 67b is formed substantially in the central region (in the radial direction). The first recess 67b is opposed to projections 68a of the resin magnet 68.

As illustrated in FIG. 10, impeller positioning holes 67c used to attach the impeller 60b are formed in an impeller attachment portion 67a with substantially equal intervals between them in the circumferential direction. The number of impeller positioning holes 67c is, for example, three. The impeller positioning holes 67c extend through the impeller attachment portion 67a. Each of the impeller positioning holes 67c is formed on a radial line that extends through the middle position between two out of the three projections 68a of the resin magnet 68 (three projections 68a are illustrated in FIG. 10).

In addition, as illustrated in FIG. 10, gates 67e (resin injection ports) used when the rotor portion 60a is molded with the thermoplastic resin (resin portion 67) are formed on the impeller attachment portion 67a with substantially equal intervals between them in the circumferential direction. The number of gates 67e is, for example, three. The gates 67e are formed on radial lines that pass through three projections 68a of the resin magnet 68, and are located inside the impeller positioning holes 67c.

Figure 15:
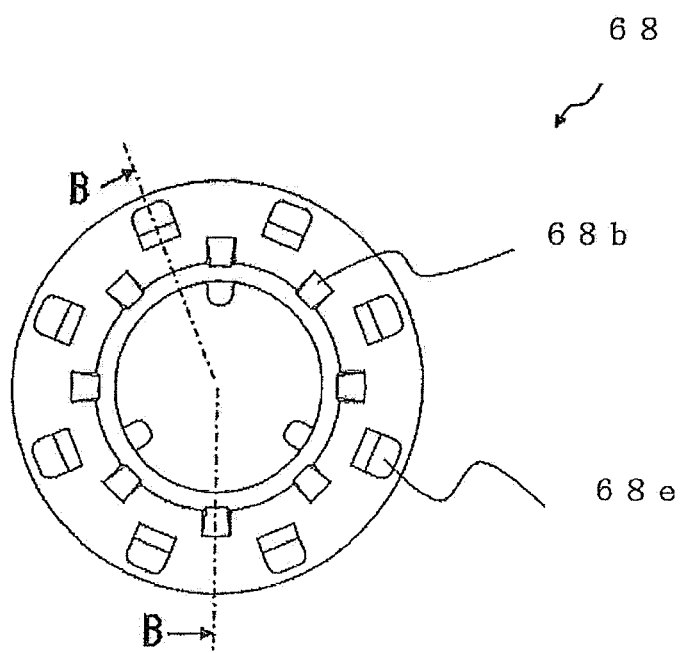

Cuts 67d, which are to be fitted to positioning projections (not shown) provided on the lower part of the mold used in resin molding, are formed in the resin portion 67 formed on the inner peripheral surface of the resin magnet 68 on the side opposite to the impeller attachment portion 67a (see FIGS. 9 and 11). In the example illustrated in FIG. 11, four cuts 67d are formed at an angular interval of approximately 90 degrees. The positions of the cuts 67d correspond to those of cuts 68b in the resin magnet 68 (to be described below; FIG. 15).

Figure 13:
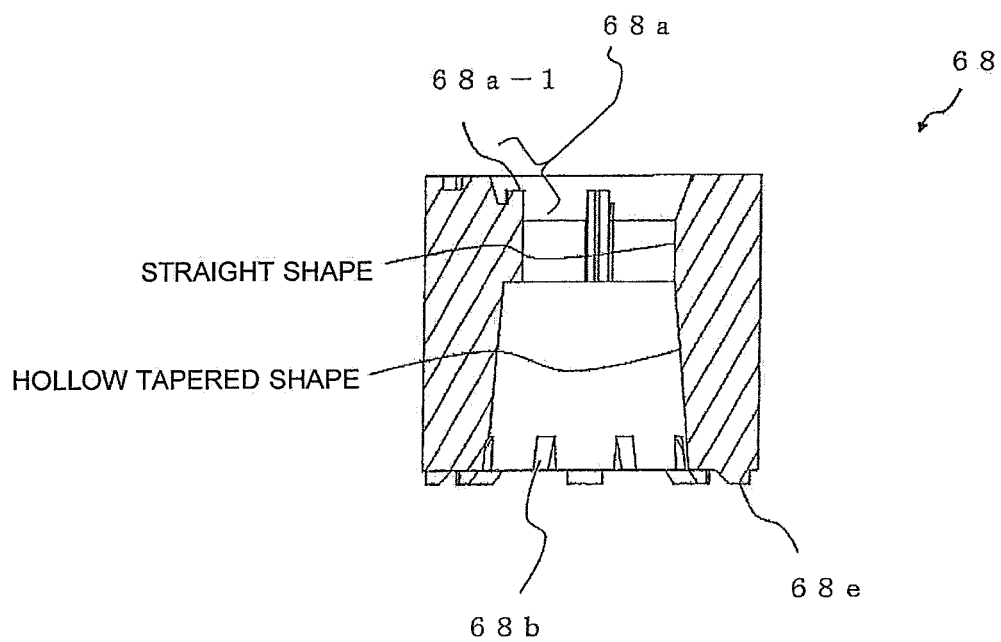
FIG. 13 is a sectional view of a resin magnet 68 according to Embodiment 1 of the present invention (a sectional view of the resin magnet 68 taken along line B-B in FIG. 15).
Figure 14:
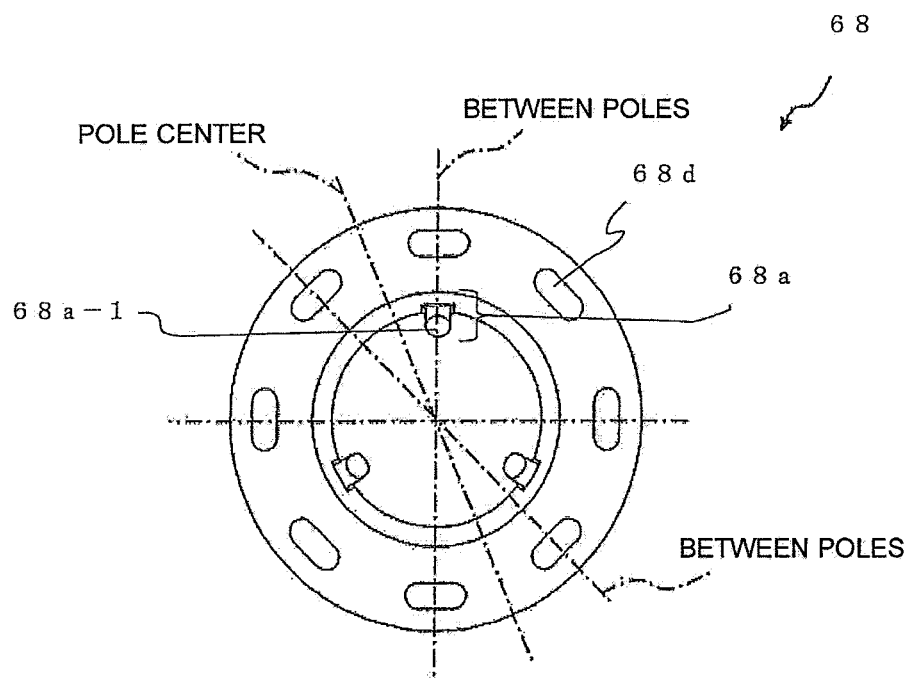
Figure 16:
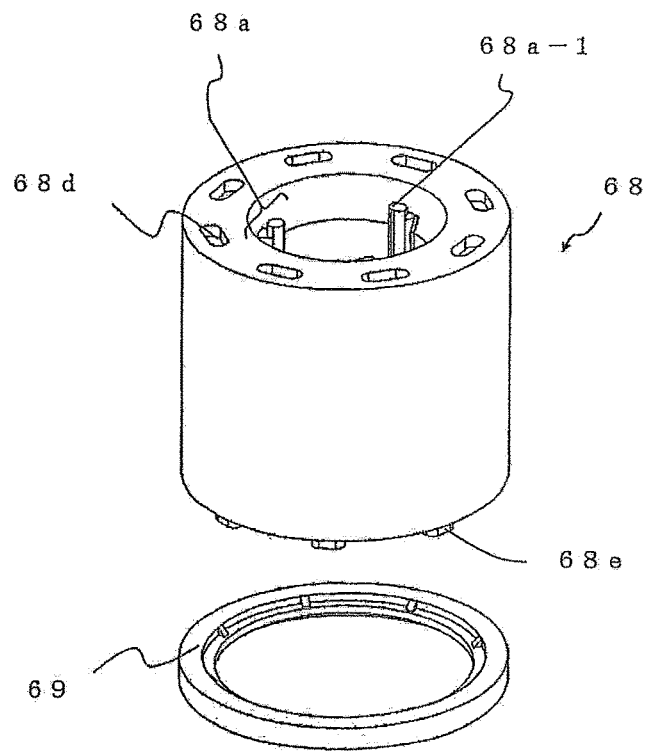
Figure 17:
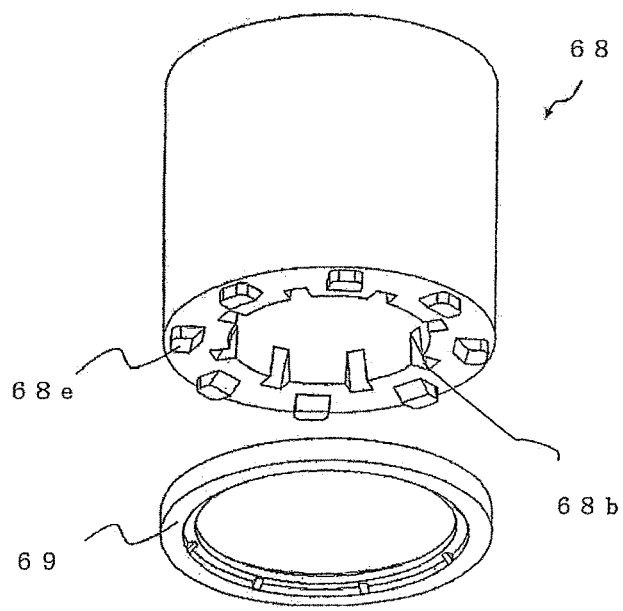
Figure 18:
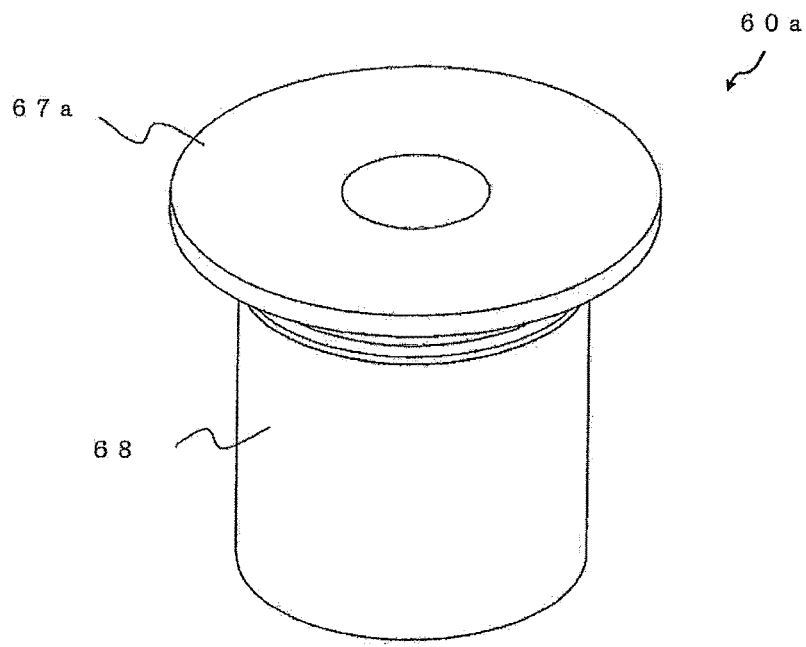
Figure 19:
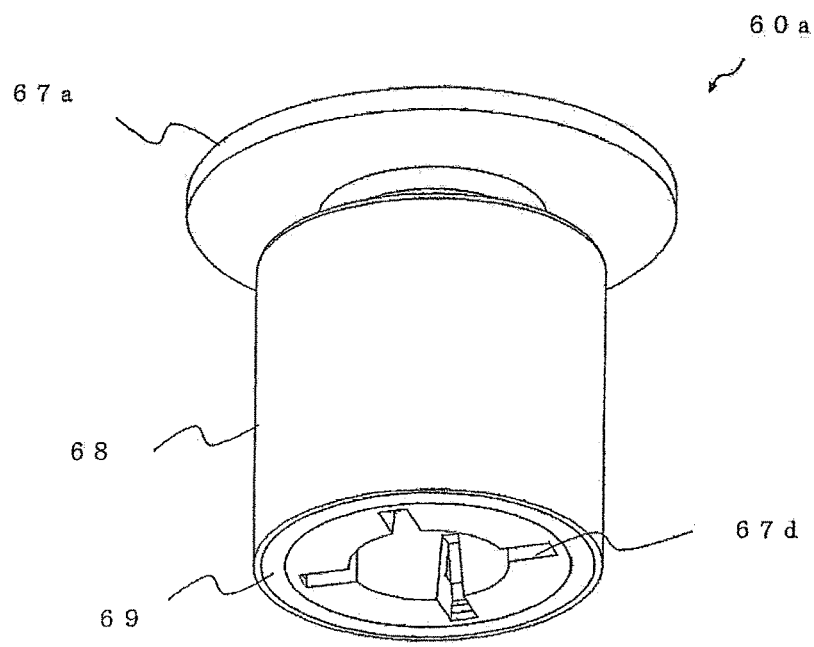

FIG. 13 is a sectional view of the resin magnet 68 according to Embodiment 1 of the present invention (a sectional view of the resin magnet 68 taken along line B-B in FIG. 15). FIG. 14 is a side view of the resin magnet 68 according to Embodiment 1 of the present invention as viewed from the side of the projections 68a. FIG. 15 is a side view of the resin magnet 68 according to Embodiment 1 of the present invention as viewed from the side opposite to the projections 68a. FIG. 16 is a perspective view of the resin magnet 68 according to Embodiment 1 of the present invention as viewed from the side of the projections 68a. FIG. 17 is a perspective view of the resin magnet 68 according to Embodiment 1 of the present invention as viewed from the side opposite to the projections 68a. FIG. 18 is a perspective view of the rotor portion 60a according to Embodiment 1 of the present invention as viewed from the side of the projections 68a. FIG. 19 is a perspective view of the rotor portion 60a according to Embodiment 1 of the present invention as viewed from the side opposite to the projections 68a.

The structure of the resin magnet 68 will now be described with reference to FIGS. 13 to 15. The resin magnet 68 described herein includes eight magnetic poles. In the state in which the resin magnet 68 is integrated in the rotor 60, the plurality of cuts 68b tapered are formed in the inner peripheral region of the end surface of the resin magnet 68 on the side opposite to the impeller attachment portion 67a. The tapered cuts 68b are arranged in the circumferential direction with substantially equal intervals between them. In the example illustrated in FIG. 15, eight cuts 68b are formed. The cuts 68b are tapered such that the diameter thereof increases from the inner region toward the end surface.

The plurality of projections 68a, which have a substantially angular shape (arc shape), are formed in the inner peripheral region of the resin magnet 68 at a predetermined depth from the end surface that opposes the end surface in which the tapered cuts 68b are formed. The projections 68a are arranged in the circumferential direction with substantially equal intervals between them. In the example illustrated in FIG. 14, the number of projections 68a is three.

As illustrated in FIG. 14, the projections 68a have a substantially angular shape in side view and have protruding portions 68a-1 on the side of the end surface. When the rotor portion 60a is formed by the molding process, the protruding portions 68a-1 at the ends of the projections 68a are held by the thermoplastic resin (resin portion 67) of the rotor portion 60a. Thus, even when a small gap is formed between the resin portion 67 and the resin magnet 68 due to shrinkage of the resin, the rotational torque of the resin magnet 68 can be reliably transmitted. As a result, the quality of the rotor portion 60a can be improved. The shape of the projections 68a is not limited to a substantially angular shape, and may be, for example, a triangular shape, a trapezoidal shape, a semi-circular shape, or a polygonal shape.

The resin magnet 68 has, on its one end surface, gates (not shown) to be supplied with a plastic magnet (a material of the resin magnet 68). The gates (not shown) are located at the pole centers. Since the gates (not shown) to be supplied with the resin magnet 68 are at the magnetic pole centers, the alignment accuracy of the resin magnet 68 can be increased.

As illustrated in FIG. 13, a hollow portion of the resin magnet 68 has a straight shape from the end surface on which the projections 68a are formed to a position around the center in the axial direction, and has a hollow tapered shape from its end surface which opposes that on which the projections 68a are formed to the position around the center in the axial direction. Therefore, the molded part can be easily removed from a mold. As a result, the productivity of the resin magnet 68 can be increased and the manufacturing cost can be reduced. That is, since the hollow portion of the resin magnet 68 has a hollow tapered construction, the risk that a part or the entirety of the molded part will adhere to the mold and cannot be removed from the mold (the risk of adhesion to the mold) can be reduced and the productivity of the resin magnet 68 can be increased. The mold used to form the resin magnet 68 can be divided into a fixed mold part and an operated mold part at a position corresponding to the end surfaces of the projections 68a on the side on which the hollow portion is tapered, and a part of the hollow portion formed by the operated mold part has a straight shape. Accordingly, the adhesion to the fixed mold part can be more reliably prevented, and the productivity of the resin magnet 68 can be increased. Removal from the operated mold part is performed by using an ejector pin.

As illustrated in FIGS. 15 and 16, in the state in which the resin magnet 68 is molded in the rotor 60, a plurality of projections 68e (eight projections 68e in the example illustrated in FIG. 15), which serve as a base for the magnetic pole position detection resin magnet 69, are arranged radially on the resin magnet 68 on the side on which the magnetic pole position detection resin magnet 69 is installed. In addition, a plurality of recesses 68d (eight recesses 68d in the example illustrated in FIG. 16) that have a substantially elongated-hole-shaped cross-section are arranged radially in the end surface of the resin magnet 68 on the side of the impeller attachment portion 67a. When the rotor portion 60a is formed by the molding process using the thermoplastic resin (resin portion 67), the projections 68e and the recesses 68d are embedded in the thermoplastic resin (resin portion 67), and the resin magnet 68 is held by the resin portion 67.

As illustrated in FIG. 15, the projections 68e, which are formed on the side on which the magnetic pole position detection resin magnet 69 is installed and which serve as a base for the magnetic pole position detection resin magnet 69, are formed substantially at the centers of the magnetic poles formed in the rotor 60. In other words, the projections 68e are arranged radially at the positions of the gates (not shown) to be supplied with the material of the resin magnet 68.

Since the projections 68e are provided at the pole centers, the magnetic force at the pole centers can be increased. Accordingly, the magnetic force of the magnet can be increased, so that the performance of the pump can be improved.

The recesses 68d formed in the resin magnet 68 on the side of the impeller attachment portion 67a are located between the magnetic poles formed in the rotor 60, that is, between the gates (not shown) to be supplied with the material of the resin magnet 68. When the recesses 68d are provided between the poles of the resin magnet 68, the amount of reduction in magnetic force can be kept as small as possible, and degradation in performance of the pump 10 can be suppressed.

In the resin magnet 68, at least one of the number of projections 68e that serve as a base for the magnetic pole position detection resin magnet 69 and the number of recesses 68d formed on the side of the impeller attachment portion 67a is the same as the number of magnetic poles formed in the rotor 60. When the numbers of projections 68e and recesses 68d are the same as that of magnetic poles, the imbalance in magnetic force can be suppressed.

A Hall IC which is surface-mounted on the board 58 and in which the Hall element 58b, which serves as a magnetic sensor, and an IC for converting a signal output from the Hall element 58b into a digital signal are formed in a single package is used as a magnetic pole position detection element. By using the Hall IC, the main magnetic flux of the magnetic pole position detection resin magnet 69 is detected on the end surface of the magnetic pole position detection resin magnet 69 in the axial direction (its surface opposing the magnetic pole position detection element).

The magnetic pole position detection resin magnet 69 has a substantially ring shape, and is opposed to the Hall element 58b. Therefore, the Hall element 58b can easily detect the main magnetic flux of the position detection magnet 69. Accordingly, compared to the case in which the Hall element 58b is fixed to the board 58 with a Hall element holder (not shown) and the main magnetic flux of the resin magnet 68 is detected on the side surface of the resin magnet 68, the position detection accuracy can be increased and the quality of the pump can be improved.

In addition, since the Hall element holder is not necessary, the processing cost of the board 58 can be reduced, and the cost of the pump 10 can be reduced accordingly.

Figure 23:
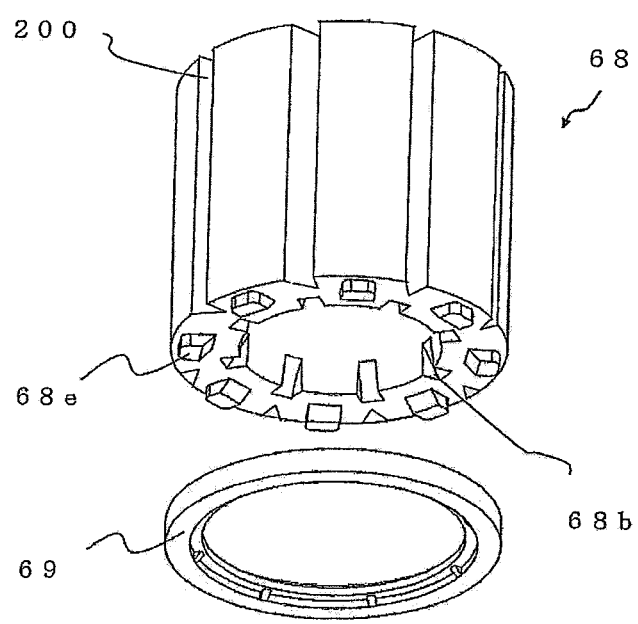
FIG. 23 is a perspective view of the resin magnet 68 according to Embodiment 1 of the present invention as viewed from the side opposite to the projections 68a, illustrating groove portions 200.

As illustrated in FIG. 23, the resin magnet may have a plurality of groove portions 200 that have a substantially angular shape and that are arranged radially in the outer peripheral portion of the resin magnet. The groove portions 200 extend in the axial direction from the two end surfaces of the magnet toward the axial center, and are embedded in a thermoplastic resin when molded with the thermoplastic resin.

The groove portions 200 have substantially the same shape and are arranged radially, and are located between the magnetic poles formed in the rotor. When the groove portions 200 are located between the poles of the resin magnet, compared to the case in which the groove portions are provided at the pole centers, the amount of reduction in magnetic power can be kept as small as possible, and degradation in performance of the pump can be suppressed. In addition, when the groove portions 200 extend to the two end surfaces of the resin magnet, the magnet can be more securely held.

Next, the integral molding process for forming the rotor 60 of an electric motor for a pump by using a thermoplastic resin will be described.

The mold with which the resin magnet 68, the magnetic pole position detection resin magnet 69, and the sleeve bearing 66 are integrally molded together includes an upper mold part and a lower mold part (not shown). First, the sleeve bearing 66 is set in the lower mold part. Since the cross-sectional shape of the sleeve bearing 66 is symmetrical, it is not necessary to control the orientation in the circumferential direction when setting the sleeve bearing 66 in the mold. Although the sleeve bearing 66 has the projections 66a (see FIG. 12) on its outer peripheral portion, the positions of the projections 66a are not particularly limited. Therefore, the process can be simplified and the productivity can be increased to reduce the manufacturing cost.

When the sleeve bearing 66 is set in the lower mold part, the inner periphery of the sleeve bearing 66 is held by a sleeve-bearing receiving portion (not shown) provided on the lower mold part, so that the sleeve bearing 66 can be arranged accurately coaxially with each of the magnetic pole position detection resin magnet 69 and the resin magnet 68, which are set in the subsequent steps.

Next, the magnetic pole position detection resin magnet 69 is set in the lower mold part. Since the cross-sectional shape of the magnetic pole position detection resin magnet 69 is symmetrical, it is not necessary to control the orientation of the magnetic pole position detection resin magnet 69 in the circumferential direction in setting the magnetic pole position detection resin magnet 69 in the mold. The magnetic pole position detection resin magnet 69 has steps on their two sides in the thickness direction, and ribs configured to serve as rotation stoppers when embedded in a resin are provided on the steps on their two sides. However, the positions of the ribs are not particularly limited. Therefore, the processes can be simplified and the productivity can be increased to reduce the manufacturing cost.

When the magnetic pole position detection resin magnet 69 is set in the lower mold part, the inner periphery of the magnetic pole position detection resin magnet 69 is held by a portion of the lower mold part (not shown) for receiving the magnetic pole position detection resin magnet 69, so that the magnetic pole position detection resin magnet 69 can be arranged accurately coaxially with each of the sleeve bearing 66 and the resin magnet 68, which is set in a subsequent step.

After the sleeve bearing 66 and the magnetic pole position detection resin magnet 69 have been set in the lower mold part, the resin magnet 68 is set such that the tapered cuts 68b, which are formed on the inner periphery of one end surface of the resin magnet 68 (its end surface on the side opposite to the impeller attachment portion 67a in the rotor 60 of the electric motor for the pump), are fitted to positioning projections (not shown) provided on the lower mold part. Although eight cuts 68b are provided in the example illustrated in FIG. 15, four out of the eight cuts 68b, which are arranged at an angular interval of approximately 90 degrees, are fitted to the positioning projections (not shown) on the lower mold part so that the sleeve bearing 66, the magnetic pole position detection resin magnet 69, and the resin magnet 68 are arranged accurately coaxially with each other. The reason why eight cuts 68b are provided is to facilitate the process of attaching the resin magnet 68 to the lower mold part.

Then, the magnet pressing portion (not shown) of the upper mold part is pressed against the projections 68a, which have a substantially angular shape, in the axial direction, and are formed on the inner periphery of the other end surface of the resin magnet 68 (the end surface on the side of the impeller attachment portion 67a in the rotor 60 of the electric motor for the pump). Thus, the sleeve bearing 66, the magnetic pole position detection resin magnet 69, and the resin magnet 68 are positioned with respect to each other in the axial direction.

In the example illustrated in FIG. 14, a total of three projections 68a which have a substantially angular shape (or arc shape) are provided on the inner periphery of the resin magnet 68, and mold attachment surfaces (portions pressed by the mold) of the projections 68a are exposed after the integral molding process. The reason why three projections 68a are provided is not only to ensure sufficient positioning accuracy for the resin magnet 68 but also to ensure sufficient inflow channel for the thermoplastic resin in the integral molding process, thereby easing the molding conditions in the integral molding process and increasing the productivity.

Even when a gap is present between a portion of the lower mold part (not shown) that receives the resin magnet 68 and the outer periphery of the resin magnet 68, an appropriate positional relationship and concentricity among the sleeve bearing 66, the magnetic pole position detection resin magnet 69, and the resin magnet 68 can be ensured by ensuring appropriate concentricity with the inner-periphery pressing portions (positioning projections) of the lower mold part and clamping the sleeve bearing 66, the magnetic pole position detection resin magnet 69, and the resin magnet 68 between the upper and lower mold parts. As a result, the quality of the pump 10 can be improved.

In contrast, when a gap is present between the portion of the lower mold part (not shown) that receives the resin magnet 68 and the outer periphery of the resin magnet 68, the resin magnet 68 can be easily set in the mold, and the manufacturing cost can be reduced. In addition, the thermoplastic resin flows into a space around the outer periphery of the resin magnet and covers the resin magnet, so that the resin magnet can be securely held. As a result, the quality of the pump can be improved.

After the resin magnet 68, the magnetic pole position detection resin magnet 69, and the sleeve bearing 66 have been set in the mold, a thermoplastic resin, such as polyphenylene ether (PPE), is injected to form the rotor portion 60a. At this time, the cuts 68b in the resin magnet 68 that are not pressed by the mold (FIG. 17), that is, four out of the cuts 68b, the projections 68e provided on the end surface of the resin magnet 68 on the side on which the magnetic pole position detection resin magnet 69 is installed, and the recesses 68d formed in the end surface of the resin magnet 68 on the side of the impeller attachment portion 67a, are embedded in the resin portion 67 formed of the thermoplastic resin and serve as rotational-torque transmitting portions. Since the projections 68e and the recesses 68d are embedded in the resin portion 67 formed of the thermoplastic resin, the resin magnet 68 is securely held.

When the groove portions 200 are formed in the outer peripheral portion of the resin magnet, the groove portions 200 are embedded in the resin portion formed of the thermoplastic resin. When portions other than the groove portions 200 formed in the outer peripheral portion of the magnet are exposed on the outer periphery of the rotor, the distance between the stator and the magnet can be reduced. Consequently, the density of the coupled magnetic flux increases and the performance of the motor that drives the pump can thus be improved.

Since the gates are provided at the pole centers of the resin magnet, weld lines, which are V-notched thin string-like marks formed at positions where flow fronts (end portions of flow) of the resin magnet meet, are formed between the poles. Since the groove portions 200 are formed between the poles of the resin magnet, the thermoplastic resin fills the groove portions 200 and securely holds the weld lines of the resin magnet, so that cracking of the magnet due to thermal shock can be suppressed.

When the gates are provided at positions between the poles of the resin magnet, the weld lines of the resin magnet are formed at the pole centers (thick portions of the resin magnet). Since the groove portions 200 are formed at positions between the poles of the resin magnet, the thermoplastic resin fills the groove portions 200 (thin portions of the resin magnet) and securely holds the resin magnet, so that cracking of the magnet due to thermal shock can be suppressed.

When the resin magnet 68 is magnetized after the resin magnet 68, the magnetic pole position detection resin magnet 69, and the sleeve bearing 66 have been integrally molded together with the thermoplastic resin (resin portion 67), the cuts 67d (four cuts 67d in FIG. 11) formed on the inner periphery of the end surface of the resin magnet 68 on the side opposite to the impeller attachment portion 67a in the rotor portion 60a may be used for positioning so as to accurately magnetize the resin magnet 68.

As described above, Embodiment 1 has the following advantages.

(1) The resin magnet 68, which is integrally molded together with the sleeve bearing 66 and the magnetic pole position detection resin magnet 69 in the rotor portion 60a, has the projections 68e, which serve as a base for the magnetic pole position detection resin magnet 69, on the end surface on the side on which the magnetic pole position detection resin magnet 69 is installed, and the recesses 68*d*, which are arranged radially and have an elongated-hole-shaped cross-section, in its end surface on the side of the impeller attachment portion 67*a*. In the integral molding process using the thermoplastic resin (resin portion 67), the projections 68*e* and the recesses 68*d* are embedded in the thermoplastic resin (resin portion 67), and the resin magnet 68 is held accordingly, so that the resin magnet 68 can be securely held. In addition, the position detection accuracy can be increased by accurately positioning the ring-shaped position detection magnet and detecting the main magnetic flux of the position detection magnet. As a result, the quality of the pump can be improved.

(2) The resin magnet has the groove portions 200 that have a substantially angular shape and that are arranged radially in its outer peripheral portion. In the integral molding process using the thermoplastic resin (resin portion 67), the groove portions 200 are embedded in the thermoplastic resin (resin portion 67), and the resin magnet 68 is held accordingly. Thus, the resin magnet 68 can be securely held without increasing the distance between the stator and the resin magnet in the radial direction.

(3) The projections 68*e*, which are formed on the resin magnet 68 on the side on which the magnetic pole position detection resin magnet 69 is installed and serve as a base for the magnetic pole position detection resin magnet 69, are located substantially at the centers of the magnetic poles in the rotor 60. The projections 68*e* have substantially the same shape, and are arranged radially. Therefore, sufficient magnetic power for magnetic pole position detection can be ensured.

(4) The recesses 68*d*, which are formed in the resin magnet 68 on the side of the impeller attachment portion 67*a*, are located between the magnetic poles in the rotor 60. The recesses 68*d* have substantially the same shape, and are arranged radially. Therefore, the amount of reduction in magnetic force due to the recesses 68*d* in the resin magnet 68 can be kept small.

(5) In the state in which the resin magnet 68 is molded in the rotor 60, at least one of the number of projections 68*e*, which are formed on the side opposite to the magnetic pole position detection resin magnet 69 and which serve as a base for the magnetic pole position detection resin magnet 69, and the number of recesses 68*d*, which are formed on the side of the impeller attachment portion 67*a*, is the same as the number of magnetic poles formed in the rotor 60. Accordingly, the imbalance in magnetic force of the resin magnet 68 can be suppressed.

(6) The resin magnet 68 has gates (not shown) to be supplied with the material of the resin magnet 68 on its one end surface, and the gates (not shown) are located at substantially the centers of the magnetic poles. Accordingly, the alignment accuracy of the resin magnet 68 can be increased.

(7) The hollow portion of the resin magnet 68 has a straight shape from the end surface on which the projections 68*a* are formed to a position around the center in the axial direction, and has a hollow tapered shape from the end surface that opposes the end surface on which the projections 68*a* are formed to the position around the center in the axial direction. Accordingly, the productivity of the resin magnet 68 can be increased.

Figure 20:
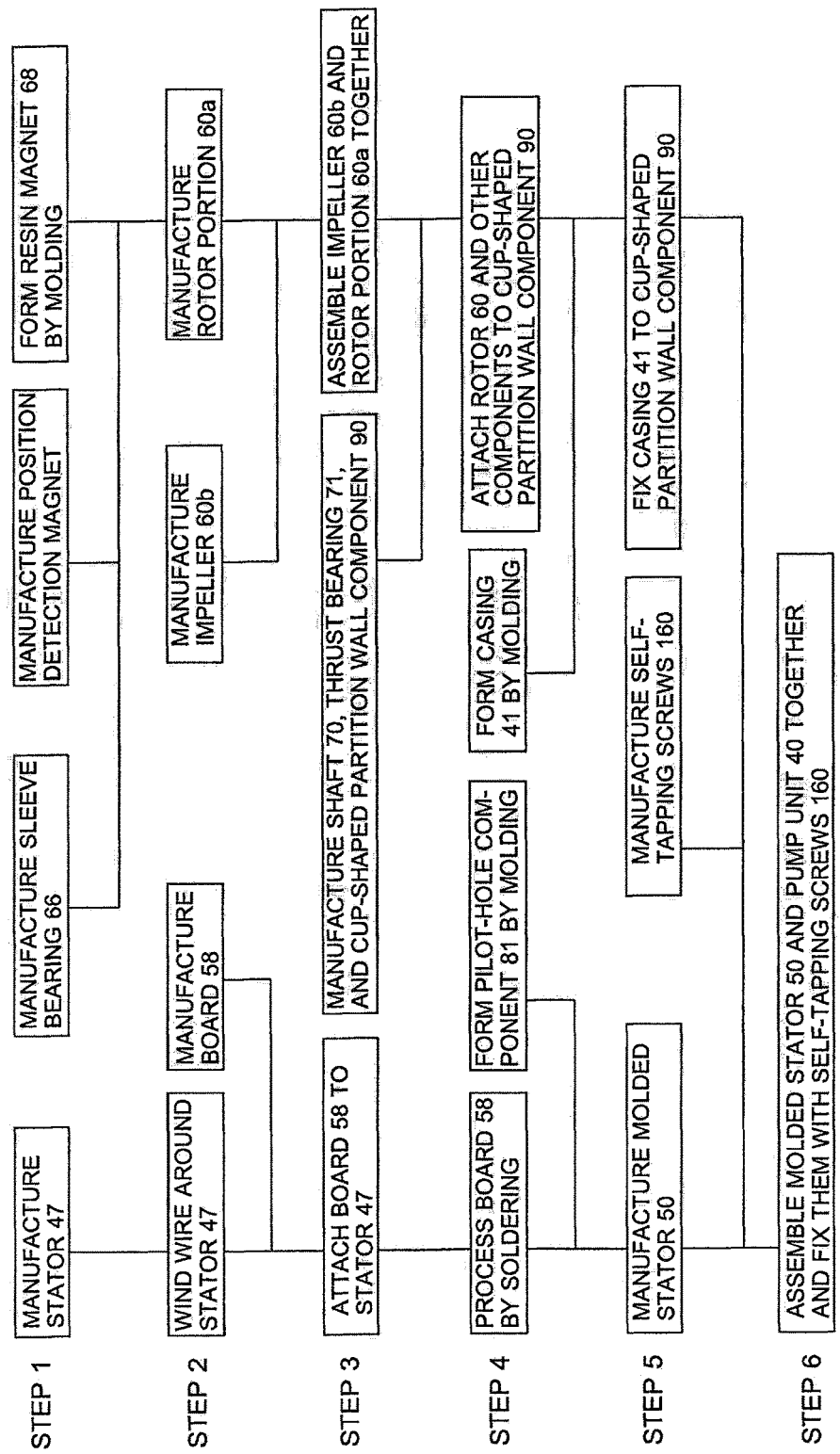
FIG. 20 is a diagram illustrating steps for manufacturing a pump 10 according to Embodiment 1 of the present invention.

FIG. 20 is a diagram illustrating the manufacturing steps of a pump 10 according to Embodiment 1 of the present invention. The manufacturing steps of the pump 10 will now be described with reference to FIG. 20.

(1) Step 1: A stator 47 is manufactured. First, strip-shaped electromagnetic steel sheets are punched out of an electromagnetic sheet having a thickness of about 0.1 to 0.7 mm, and are stacked together by caulking, welding, bonding, etc., to form a strip-shaped stator core 54. In addition, a sleeve bearing 66 is manufactured. Moreover, the resin magnet 68 is formed by molding. Again, a position detection resin magnet is formed by molding.

(2) Step 2: Wires are wound around the stator 47. More specifically, wires are wound around the stator core 54. Insulating portions 56 made of a thermoplastic resin, such as polybutylene terephthalate (PBT), are formed on the teeth of the strip-shaped stator core 54, which are connected to each other with the thin connecting portions. Concentrated winding coils 57 are wound around the teeth on which the insulating portions 56 are formed. For example, twelve concentrated winding coils 57 are connected to form three-phase, single Y-connected windings. Since the three-phase, single Y-connected windings are formed, terminals 59 (power supply terminals to be supplied with power and a neutral terminal), to which the coils 57 of each phase (U-phase, V-phase, and W-phase) are connected, are provided on the connection side of the insulating portions 56. In addition, a board 58 is manufactured. The board 58 is clamped between a board pressing member 95 and the insulating portions 56. The IC that drives the electric motor (brushless DC motor), the Hall element that detects the position of a rotor 60, etc., are mounted on the board 58. A lead-wire guide part 61, which guides the lead wire to the outside, is attached to the cut portion of the board 58 at a position near the outer peripheral edge of the board 58. In addition, a rotor portion 60*a* is manufactured. The rotor portion 60*a* includes the ring-shaped (cylindrical) resin magnet 68 molded from pellets formed by kneading a powder of a magnetic material, such as ferrite, and a resin; a thin ring-shaped magnetic pole position detection resin magnet 69 molded from pellets formed by kneading a powder of a magnetic material, such as ferrite, and a resin; and the cylindrical sleeve bearing 66 (formed of, for example, carbon) provided inside the resin magnet 68. The resin magnet 68, the magnetic pole position detection resin magnet 69, and the sleeve bearing 66 are integrally molded together with a resin, such as polyphenylene ether (PPE). In addition, an impeller 60*b* is formed by molding. The impeller 60*b* is molded from a thermoplastic resin, such as polyphenylene ether (PPE).

(3) Step 3: A stator 47 is manufactured by attaching the board 58. The board 58 to which the lead-wire guide part 61 is attached is fixed to the insulating portions 56 with the board pressing member 95. In addition, the impeller 60*b* is attached to the rotor portion 60*a* by ultrasonic welding or the like. Moreover, a cup-shaped partition wall component 90 is formed. Again, a shaft 70 and a thrust bearing 71 are manufactured. The shaft 70 is formed of SUS. The thrust bearing 71 is formed of ceramics.

(4) Step 4: The board 58 is processed by soldering. The terminals 59 (power supply terminals to be supplied with power and a neutral terminal) are soldered on the board 58. In addition, a pilot-hole component 81 is formed by molding. Moreover, a casing 41 is formed by molding. The casing 41 is molded from a thermoplastic resin, such as polyphenylene sulfide (PPS). Again, a rotor 60 and other components are attached to the cup-shaped partition wall component 90.

(5) Step 5: A molded stator 50 is manufactured. First, a stator assembly 49 is manufactured. The stator assembly 49 is completed by attaching the pilot-hole component 81 to the stator 47.

(6) Step 5: The molded stator 50 is manufactured. Next, the molded stator 50 is manufactured by molding the stator assembly 49. In addition, a pump unit 40 is assembled by fixing the casing 41 to the cup-shaped partition wall component 90. In addition, self-tapping screws 160 are manufactured.

(7) Step 6: The pump 10 is assembled. The pump unit 40 is attached to the molded stator 50, and is fixed to the molded stator 50 with the self-tapping screws 160.

Figure 21:
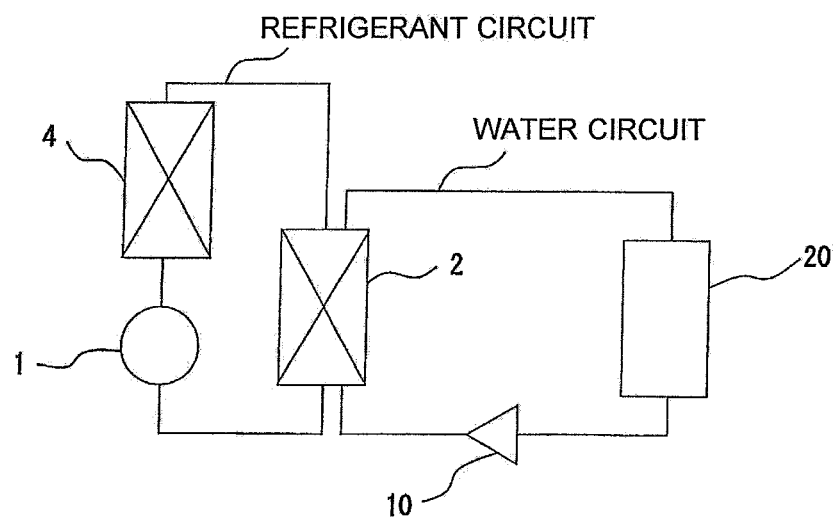
FIG. 21 is a conceptual diagram illustrating a circuit of an apparatus including a refrigerant-water heat exchanger 2 according to Embodiment 1 of the present invention.

FIG. 21 is a conceptual diagram illustrating a circuit of an apparatus including the refrigerant-water heat exchanger 2 according to Embodiment 1 of the present invention. The above-described heat-pump hot-water supply apparatus 300 is an example of an apparatus including the refrigerant-water heat exchanger 2.

The apparatus including the refrigerant-water heat exchanger 2 is, for example, an air-conditioning apparatus, a floor heating apparatus, or a hot-water supply apparatus. The pump 10 according to Embodiment 1 is mounted in a water circuit of the apparatus including the refrigerant-water heat exchanger 2, and circulates water cooled by the refrigerant-water heat exchanger 2 or water heated by the refrigerant-water heat exchanger 2 (hot water) in the water circuit.

The apparatus including the refrigerant-water heat exchanger 2 illustrated in FIG. 21 includes a refrigerant circuit including a compressor 1 (for example, a scroll compressor, a rotary compressor, etc.) that compresses a refrigerant, a refrigerant-water heat exchanger 2 that causes the refrigerant and water to exchange heat, and an evaporator 4 (heat exchanger). The apparatus also includes a water circuit including the pump 10, the refrigerant-water heat exchanger 2, and a load 20. Thus, the refrigerant circuit and the water circuit are connected to each other with the refrigerant-water heat exchanger 2 so as to transfer heat between them.

When the pump 10 including the rotor 60 of an electric motor for a pump according to Embodiment 1 is applied to the apparatus including the refrigerant-water heat exchanger 2 (air-conditioning apparatus, floor heating apparatus, or hot-water supply apparatus), since the performance and quality of the pump 10 are improved and the productivity of the pump 10 is increased, the performance and quality of the apparatus including the refrigerant-water heat exchanger 2 (air-conditioning apparatus, floor heating apparatus, or hot-water supply apparatus) can be improved and the cost of the apparatus can be reduced.

The invention claimed is:

1. A pump comprising:
a molded stator including a board on which a magnetic pole position detection element is mounted; and
a rotor including a rotor portion that is rotatably accommodated in a cup-shaped partition wall component, the rotor portion opposing the magnetic pole position detection element at one end and having an impeller attachment portion for attaching an impeller at other end,
wherein, in the rotor portion, a first magnet, a magnetic pole position detection resin magnet formed in a ring shape, and a sleeve bearing disposed inside the first magnet are assembled together by using a thermoplastic resin, and the impeller attachment portion is formed of the thermoplastic resin,
wherein the first magnet includes a first projection that serves as a base for the magnetic pole position detection resin magnet,
wherein the magnetic pole position detection resin magnet is opposed to the first projection,
wherein the first magnet includes a plurality of groove portions provided in an outer peripheral portion of the first magnet, the groove portions extending in an axial direction,
wherein the groove portions have an identical shape and are arranged radially,
wherein each of the groove portions is formed at an abutting boundary between two adjacent magnetic poles formed in the rotor;
wherein the groove portions are embedded in the thermoplastic resin, and
wherein the outer peripheral portion of the first magnet is exposed from the thermoplastic resin.

2. The pump of claim 1,
wherein the first magnet has a cylindrical shape, and includes a plurality of second projections arranged with equal intervals therebetween in a circumferential direction on an inner periphery of the first magnet, the second projections extending in an axial direction toward an end surface of the first magnet on a side of the impeller.

3. The pump of claim 1,
wherein the groove portions are formed so as to open in two end surfaces of the rotor.

4. The pump of claim 1,
wherein the first magnet includes a plurality of cuts having an angular shape and arranged radially in an end surface that opposes the magnetic pole position detection resin magnet, the cuts allowing the first magnet to be positioned in a rotational direction of the first magnet and arranged coaxially with the sleeve bearing.

5. The pump of claim 1,
wherein the first magnet is formed of a resin magnet,
wherein the first magnet includes a gate that is provided on one end surface of the first magnet and is to be supplied with a material of the resin magnet, and
wherein the gate is positioned at a magnetic pole center.

6. A refrigeration cycle apparatus in which a refrigerant circuit and a water circuit are connected to each other with a refrigerant-water heat exchanger, wherein the pump of claim 1 is mounted in the water circuit.

7. A method for manufacturing a pump, the method comprising:
manufacturing a stator core, molding a first magnet, and molding a magnetic pole position detection resin magnet, the first magnet including a first projection that serves as a base for the magnetic pole position detection resin magnet on an end surface thereof on a side on which the magnetic pole position detection resin magnet is installed, and a plurality of recesses having an elongated-hole-shaped cross-section and arranged radially in an end surface thereof on a side of an impeller attachment portion;
winding a wire around the stator core and assembling a rotor portion by integrally molding the first magnet, the magnetic pole position detection resin magnet, and a sleeve bearing together;
assembling a stator by attaching a board to the stator core around which the wire has been wound, assembling an impeller and the rotor portion together, and assembling a shaft, a thrust bearing, and a cup-shaped partition wall component together;

soldering a terminal of the stator to the board, forming a pilot-hole component by molding, forming a casing by molding, and attaching a rotor to the cup-shaped partition wall component;

assembling a stator assembly by attaching the pilot-hole component to the stator;

assembling a molded stator by integrally molding the stator and the pilot-hole component together, and assembling a pump unit by fixing the casing to the cup-shaped partition wall component; and attaching the pump unit to the molded stator and fixing the pump unit to the molded stator with a self-tapping screw, wherein the first magnet has a cylindrical shape, and includes a plurality of second projections arranged in a circumferential direction on an inner periphery of the first magnet, the second projections extending in an axial direction toward an end surface of the first magnet on a side of the impeller and being pressed by a mold in an integral molding process for forming the rotor, wherein the first magnet includes a plurality of groove portions provided in an outer peripheral portion of the first magnet, the groove portions extending in an axial direction, and wherein the groove portions have an identical shape and are arranged radially, wherein each of the groove portions is formed at an abutting boundary between two adjacent magnetic poles formed in the rotor;

wherein the groove portions are embedded in a thermoplastic resin when the first magnet, the magnetic pole position detection resin magnet, and the sleeve bearing are integrally molded together with the thermoplastic resin, and wherein the outer peripheral portion of the first magnet is exposed from the thermoplastic resin.

8. The method for manufacturing a pump of claim 7, wherein the second projections are formed with equal intervals therebetween.

9. The method for manufacturing a pump of claim 7, wherein the first magnet includes a plurality of cuts having an angular shape and arranged radially in an end surface that opposes the magnetic pole position detection resin magnet, the cuts contacting a mold in an integral molding process for forming the rotor to allow the first magnet to be positioned in a rotational direction of the first magnet and arranged coaxially with the sleeve bearing.

* * * * *